United States Patent [19]
Shakib et al.

[11] Patent Number: 6,101,513
[45] Date of Patent: *Aug. 8, 2000

[54] METHOD AND APPARATUS FOR DISPLAYING DATABASE INFORMATION ACCORDING TO A SPECIFIED PRINT LAYOUT AND PAGE FORMAT

[75] Inventors: Darren Arthur Shakib; Raman Kumar Sarin; Salim Alam, all of Redmond; John Marshall Tippett, Seattle; David Charles Whitney, Bellevue, all of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/855,756

[22] Filed: May 31, 1996

[51] Int. Cl.$^7$ ..................................................... G06F 17/21
[52] U.S. Cl. ............................................................. 707/527
[58] Field of Search ................................... 707/513–516, 707/525–527; 395/114

[56] References Cited

U.S. PATENT DOCUMENTS

| | | | |
|---|---|---|---|
| 4,951,233 | 8/1990 | Fujiwara et al. | 707/525 |
| 5,003,499 | 3/1991 | Fujiwara et al. | 707/520 |
| 5,499,331 | 3/1996 | Hayashi et al. | 707/513 |
| 5,544,301 | 8/1996 | Orton et al. | 395/157 |
| 5,544,302 | 8/1996 | Nguyen | 395/161 |
| 5,566,278 | 10/1996 | Patel et al. | 395/114 |
| 5,633,996 | 5/1997 | Hayashi et al. | 707/513 |
| 5,655,130 | 8/1997 | Dodge et al. | 707/513 |
| 5,664,182 | 9/1997 | Nierenberg et al. | 395/613 |
| 5,701,500 | 12/1997 | Ikeo et al. | 707/513 |

OTHER PUBLICATIONS

Novell, Wordperfect User's Guide, pp. 361–363, 425–427, 532–533, 1994.
Stinson, Getting the Most Out of IBM Current, pp. 13–29.

*Primary Examiner*—Joseph H. Feild
*Attorney, Agent, or Firm*—Leydig, Voit & Mayer Ltd.

[57] ABSTRACT

A system and method are described for outputting display information according to a print layout defining a set of display items on a page and relative position assignments for the display items on the page, and a separate and distinct page format describing a physical page and a set of virtual pages on the physical page. Means are provided for selecting the print layout from a set of print layouts and the page format from a set of page formats.

After the print layout and page format are selected, a view processor fills the set of pages defined in the page format with print information corresponding to the set of display items described within the selected print layout. A print output generator thereafter generates device-specific display data for rendering the physical page containing the filled set of virtual pages constructed by the view processor according to the print layout and page format and a designated output device.

30 Claims, 12 Drawing Sheets

"Printing"

Schedule Printing System

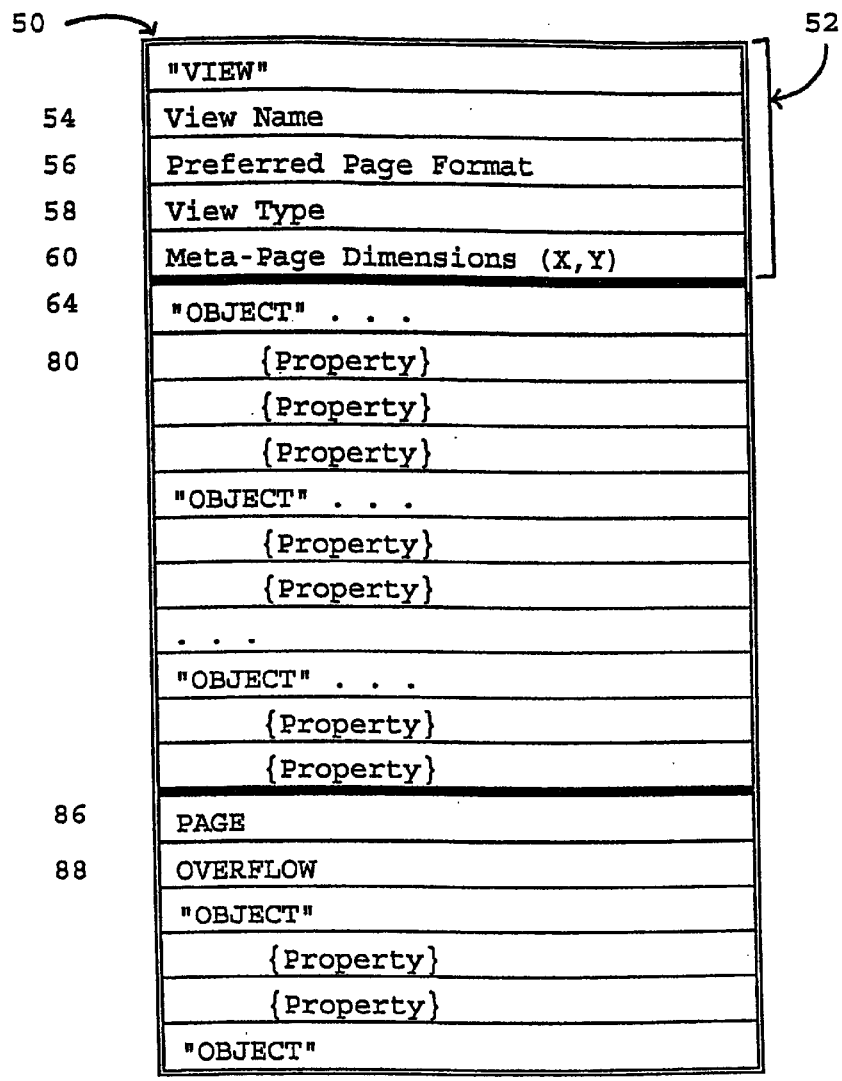
FIG. 2 PRINT LAYOUT
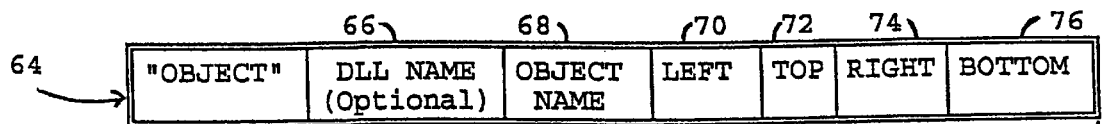
FIG. 2a OBJECT LINE ENTRY
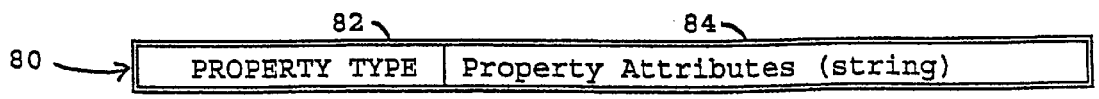
FIG. 2b PROPERTY LINE ENTRY

| | VALUE | STYLES | DELTAYMD | RANGE | DATEFMT | TIMEFMT | OPTIONS | OVERFLOW |
|---|---|---|---|---|---|---|---|---|
| 90 LINE | | | | | | | | |
| 92 RECTANGLE | | | | | | | | |
| 94 TEXT | M | | | | | | O | |
| 96 CALENDAR | | M | O | | O | | O | |
| 98 MONTH | | M | O | O | | | O | O |
| 100 SCHEDULE | | M | O | O | O | O | M | O |
| 102 TIMEFRAME | | M | | O | | O | M | |
| 104 APPOINTMENTS | | M | O | | O | O | M | O |
| 106 TASKS | | M | | | | | M | O |
| 108 TASKLIST | | M | | | | | | O |
| 110 BITMAP | M | | | | | | | |
| 112 EVENTS | | M | O | O | | | O | O |
| 114 CARDLIST | | M | | | | | O | O |
| 116 OVERFLOW | | O | | | | | M | O |
| 118 EXTERNAL (DLL) | | | | | | | | |

FIG. 3 PRINT OBJECT CLASSES AND ASSOCIATED PROPERTIES

LEGEND
M = MANDATORY
O = OPTIONAL
BLANK = Not Applicable

| | |
|---|---|
| 124 | "FORMAT"<br>"{format name}", {Width}, {Height}, {Orientation} |
| 126 | "MARGINS"<br>{Units}, {Top}, {Left}, {Right}, {Bottom}, {Mirror} |
| 128 | "FONT SIZE" {font size} |
| 130 | "HINTS" |
| 132 | "PAGE SIZE" {XDimension}, {YDimension} |
| 134 | "STYLE"<br>    style1 specification<br>    style2 specification<br>    style3 specification |
| 156 | "PAGE" {Xposition}, {Yposition} |
| 158 | "PAGEINFO"<br>{Page Order Simplex}, {Page Order Duplex}, {Side} |
| 160 | "INVERT"<br>{Simplex Invert Page}, {Duplex Invert Page} |
| | . . . |
| | "PAGE" {Xposition}, {Yposition} |
| | "PAGEINFO"<br>{Page Order Simplex}, {Page Order Duplex}, {Side} |
| | "INVERT"<br>{Simplex Invert Page}, {Duplex Invert Page} |

FIG. 4 PAGE FORMAT

| | |
|---|---|
| 136 | {style name}, |
| 138 | "{friendly style name}", |
| 140 | "{font name}", |
| 142 | Built-in-font:<br>SWISS/ROMAN/MODERN/DECORATIVE/DONTCARE, |
| 144 | {small-point-size}, |
| 146 | {medium-font-size}, |
| 148 | {large-font-size}, |
| 150 | BOLD, |
| 151 | ITALIC, |
| 152 | UNDERLINE, |
| 153 | STRIKEOUT |

FIG. 4a STYLE SPECIFICATION

| | |
|---|---|
| 200 | Data Section |
| 202 | Set Rectangle |
| 204 | Get Rectangle |
| 206 | Install |
| 208 | Parse |
| 210 | Increment Image |
| 212 | End Page |

FIG. 5 PRINT OBJECT CLASS STRUCTURE

| | |
|---|---|
| 600 | Catch Object Element Count |
| 602 | Maximum Catch Object Elements |
| 604 | Pointer to Catch Object Element List |
| 606 | Catch-all Object Name |
| 608 | Remove Printed Elements |
| 610 | Add Element |
| 612 | Clear Element List |
| 614 | Render Catch Objects |
| 616 | Move Unprinted Catch Objects |
| 618 | Has Text? |
| 620 | Catch-all Empty? |
| 622 | Provide Catch-all Name |
| 624 | Add Text |
| 626 | Add List Item |
| 628 | Add Page Break |
| 630 | Add Vertical Space |
| 632 | Add Graphic Horizontal Line |

FIG. 6 CATCH-ALL OBJECT CLASS STRUCTURE

| | |
|---|---|
| 640 | Vertical Space Needed |
| 642 | Minimum Height Increment |
| 644 | Increment Image |
| 646 | Spacing Object? |

FIG. 7 CATCH OBJECT CLASS STRUCTURE

| | |
|---|---|
| 220 | Data Section |
| 222 | Internal Utilities |
| 224 | Current Virtual Page |
| 226 | Virtual Page Count |
| 228 | Set Device Context |
| 230 | Get Device Context |
| 232 | Set Current Virtual Page |
| 234 | Parse Style |
| 236 | Add Style |
| 238 | Device Install |
| 240 | Create Virtual Pages |
| 242 | Render |
| 244 | End Page |

FIG. 8 PRINTER OBJECT CLASS STRUCTURE

| | |
|---|---|
| 250 | Data Section |
| 252 | Install |
| 254 | Text Draw |
| 256 | Rectangle Draw |
| 258 | Line Draw |
| 260 | Bitmap Draw |
| 262 | Draw Object |
| 263 | Make Lego |
| 264 | Render Page |
| 265 | Draw Lego |
| 266 | End Page |
| 268 | Font Size |
| 269 | Font Width |
| 270 | Set Font |
| 272 | Set Style |
| 274 | Set Invert Status |
| 276 | Get Invert Status |
| 278 | Set Virtual Page |
| 280 | Set Physical Page |

FIG. 9 VIRTUAL PAGE OBJECT CLASS STRUCTURE

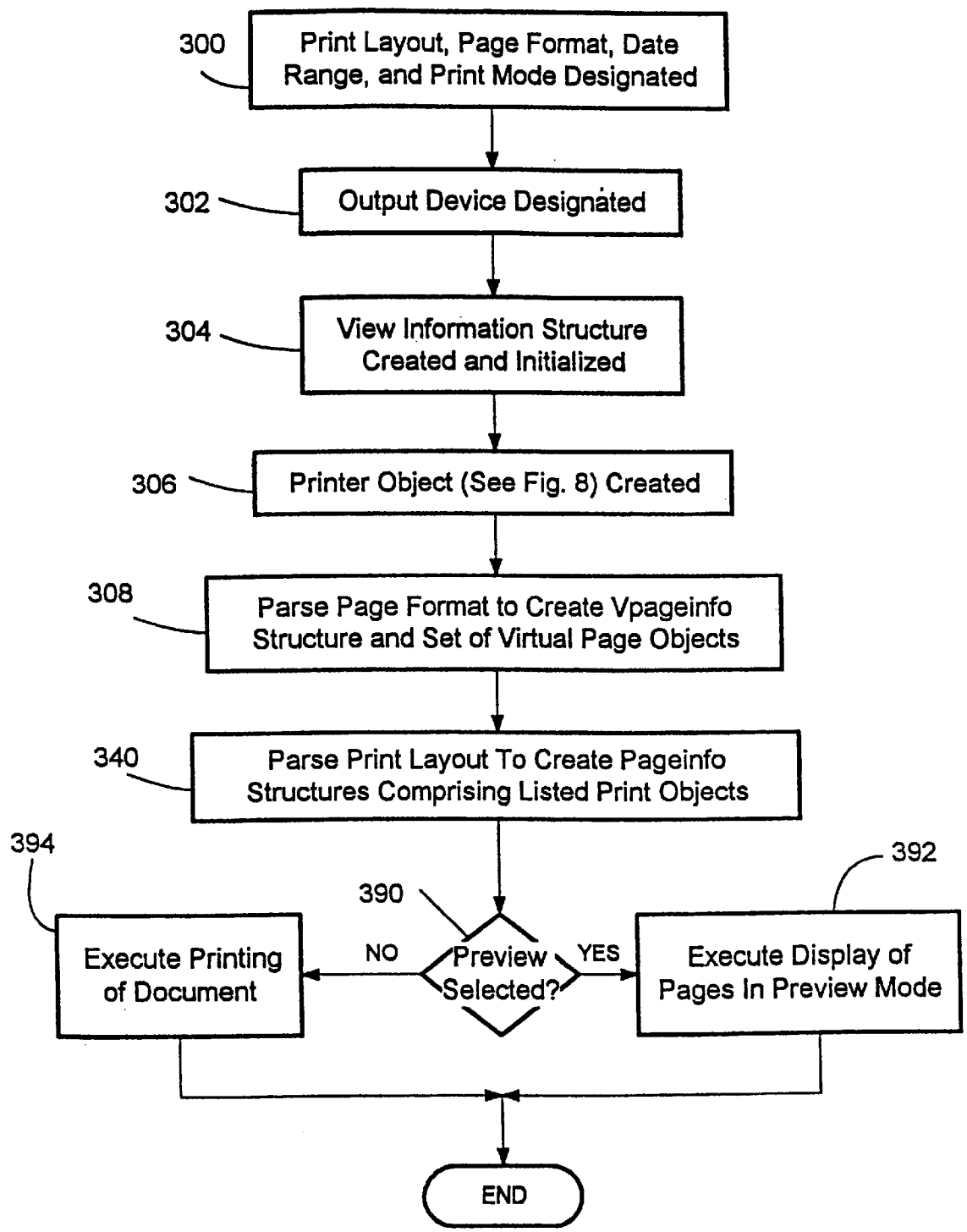
FIG. 10 "Printing"

| | |
|---|---|
| 310 | XLEFT |
| 312 | YTOP |
| 314 | Page Side |
| 316 | PAGE ORDER {Simplex, Duplex} |
| 318 | INVERT {Simplex, Duplex} |

FIG. 11 VPAGE STRUCTURE

| | |
|---|---|
| 320 | Landscape |
| 322 | Pointers to VPAGE Structures |
| 324 | Number of Virtual Pages on Physical Page |
| 326 | X dimension of Physical Page |
| 328 | Y dimension of Physical Page |
| 330 | X dimension of Virtual Page |
| 332 | Y dimension of Virtual Page |
| 334 | Range of Print Layout Pages Needed to Print a Physical Page |

FIG. 12 VPAGEINFO STRUCTURE

| # | |
|---|---|
| 344 | VIEW NAME |
| 346 | Preferred Format |
| 348 | View Type |
| 350 | Default Orientation |
| 352 | Preview |
| 354 | Meta-page Dimensions |
| 356 | Physical Page Area Within Margins |
| 358 | Total Physical Page Dimensions |
| 360 | Current Date |
| 362 | Last Date of Printing Range |
| 364 | Last Date of Print Job |
| 366 | Pointer to First Pageinfo |
| 368 | Pointer to Current Pageinfo |
| 370 | Number of Pageinfo |
| 372 | Pointer to Current Page Format |
| 374 | Pointer to VPAGEINFO structure |
| 376 | Print Setup Information |
| 378 | Print Dialog Information |
| 380 | X dimension conversion |
| 382 | Y dimension conversion |

342

FIG. 13 VIEW INFORMATION

PARSING THE PRINT LAYOUT

METHOD AND APPARATUS FOR DISPLAYING DATABASE INFORMATION ACCORDING TO A SPECIFIED PRINT LAYOUT AND PAGE FORMAT

AREA OF THE INVENTION

The present invention relates generally to display engines for generating and displaying an image according to a set of output display instructions and data. In particular, the present invention relates to display engines for generating a visual output on a printer or display device based upon an input comprising both a description of displayed items and a manner in which the displayed items are to be arranged on the visual output.

BACKGROUND OF THE INVENTION

Forms or alternatively views, organize data into pre-set regions of a page and often include graphical boxes, bitmaps, and various print styles. Forms thus enable a user to print out information in an organized and easy-to-read manner giving the output a finished appearance found pleasing by a great number of people. Because of these desirable features, forms have become a much desired extension of many user applications.

It is known to hand code a set of forms which are then provided for a user. A shortcoming of such views is that they cannot be modified by the user. Furthermore, such forms do not share common code and therefore creating a new form requires producing a complete set of print code for the new form. While users often praise the forms provided for applications, there is a demand for providing a wide variety of forms for the diverse needs and preferences of users. However, because each form is separately coded and maintained in a fully compiled state, providing a wide variety of forms requires a large number of resources and requires a large amount of memory space.

Another known function of forms is the ability to "emerge" a form or view with information previously stored in a separate source file in a computer system. Such merge systems have existed for a number of years and enable users to fill in pre-determined fields within a form. However, these systems merely merge data onto static forms created for a specific type of page format.

Martin et al. U.S. Pat. No. 4,870,611 describes a print services facility that takes input data from an application program, applies form definition information provided by a utility program, and transmits the resulting output data set to a visual display. However, the definition of the content of the page and the manner in which the contents are displayed are combined into a single FORMDEF file. Therefore, a user cannot separately designate combinations of print layouts defining the content and arrangement of items on a single page with page formats defining a layout of pages on a physical page having a specified size. The inability to separately designate these pieces of information generally results in a more limited set of choices provided to the user in regard to the manner in which the data is arranged and displayed during output on a selected visual output device.

SUMMARY OF THE INVENTION

It is a general object of the present invention to provide a means for providing a great variety of print views of pre-stored data for a user.

It is a more specific object of the present invention to enable a user to print out pre-stored database information within a particular layout on a variety of page formats having different physical page sizes and arrangements of pages upon a physical page.

It is yet another object of the present invention to enable a user to print out pre-stored database information in a variety of page layout forms.

It is another object of the present invention to facilitate describing complex layouts for a printed page in simple files that can be readily created and edited by a form author.

It is yet another object of the present invention to provide a means for providing a large number of print layouts and page format combinations in a relatively small segment of data storage.

It is still another object of the present invention to provide a printing system having enhanced print speed and extensibility.

In view of the above objects and other objects that will be apparent in view of the detailed description of the preferred embodiment, the present invention comprises a system for outputting display information according to a print layout including a first set of entries describing a set of display items to be displayed on a page and relative position assignments for the display items on the page, and a separate and distinct page format describing a physical page and including a second set of entries describing a set of pages, and the arrangement of the set of pages on the physical page. A user is provided means for selecting the print layout from a set of print layouts. The user is also provided means for selecting the page format from a set of page formats. The ability to separately define and select separate page formats and print layouts provides a wide variety of display views of information without having to separately define each and every view.

After the print layout and page format are selected, a view processor creates a set of output pages based upon the set of pages defined in the page format and print information corresponding to the first set of entries within the selected print layout. A print output generator thereafter generates device-specific display data for rendering the physical page containing the set of output pages constructed by the view processor according to the print layout and page format.

In accordance with an embodiment of the present invention, the set of pages and the display items are represented internally by objects created from predefined class structures including both data and a set of specified routines. In addition, a parser is provided by the print system that facilitates compiling high level descriptions of a particular view contained within a selected print layout and a selected page format. As a consequence, the system is very extensible in regard to the creation and addition of new views for information.

In accordance with yet another aspect of a preferred embodiment of the present invention, a set of basic printing elements are defined. The set of basic printing elements are utilized by the printing system in order to create a view of a physical page according to a selected print layout, page format, and a user file.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 2 is a schematic drawing illustratively depicting a print layout file in accordance with a preferred embodiment of the present invention;

FIG. 2a schematically depicts a preferred set of information associated with a single print object line entry in a print layout file;

FIG. 2b schematically depicts a preferred set of information used to identify and describe a property for a print object;

FIG. 3 is a table listing the set of print object sub-classes provided by the preferred printing system and their applicable properties;

FIG. 4 is a schematic drawing illustratively depicting a page format file in accordance with a preferred embodiment of the present invention;

FIG. 4a schematically depicts a preferred set of fields for defining a style;

FIG. 5 illustratively depicts the content of objects defined according to the print object class plan, and more particularly the set of routines provided by print objects;

FIG. 6 illustratively depicts the content of objects defined according to the catch-all object class plan;

FIG. 7 illustratively depicts the content of objects defined according to the catch object class plan;

FIG. 8 illustratively depicts the content of objects defined according to the printer object class plan, and more particularly the set of routines provided by the printer objects;

FIG. 9 illustratively depicts the content of objects defined according to the virtual page object class plan, and more particularly the set of routines provided by the virtual page objects;

FIG. 10 summarizes the steps performed by a printing engine and its associated components in order to print a document in accordance with a preferred embodiment of the present invention;

FIG. 11 illustratively depicts the fields of a vpage structure for defining a single virtual page in accordance with the preferred embodiment of the present invention;

FIG. 12 illustratively depicts the fields of a vpageinfo structure for defining a set of virtual pages on a single (simplex or duplex) physical page;

FIG. 13 illustratively depicts the fields of a view information structure containing the combined parsed print layout and page format files for printing out a document;

DETAILED DESCRIPTION OF THE PREFERRED EMBODIMENT

The present invention is preferably incorporated into applications where it is desirable to provide a variety of views of a particular data file to a user and to display or print out the data on a variety of page types by merely selecting a particular view and page format. In a preferred embodiment, the invention is incorporated into the well known Schedule+(v. 7.0) application of Microsoft Corporation of Redmond Washington. This particular application enables a user to enter a set of data describing appointments, meetings, tasks, etc. to be accomplished on designated days. The set of data is thereafter printed in a variety of views, including daily, weekly and monthly calendars. The views are printed on a variety of physical page types based upon a variety of folders and planners into which the printed schedule pages are thereafter inserted.

In the preferred embodiment of the present invention, a schedule page is defined by a combination of schedule data entered by a user and two separate and distinct files defining the manner in which the user entered data is printed. A print layout file describes the content and arrangement of display items on individual pages. The print layout file specifies relative dimensions and relative positions for a set of display items contained within layout pages expressed in relative dimensions. The actual dimensions of the objects and pages described in the print layout file and the positions of the pages on a physical page are specified by a separate page format file.

Figure 1:
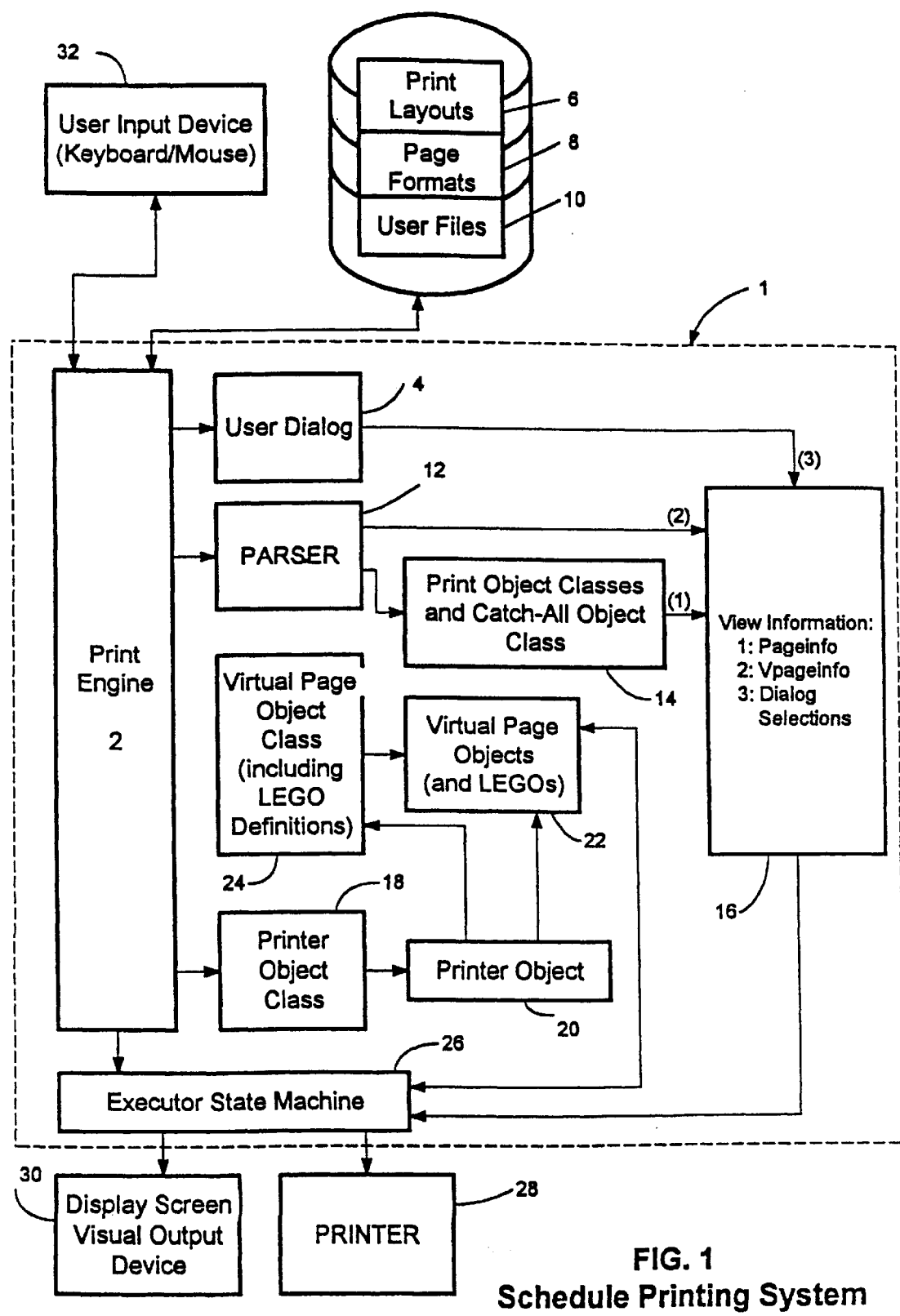
FIG. 1 is a high level system diagram of an exemplary computer system embodying the present invention including schematically depicted sub-systems for carrying out the steps of creating and processing a document in accordance with the present invention.

Turning to FIG. 1 a schematic block diagram is provided of a printing system embodying the present invention. The illustrated printing system preferably resides on a personal computer system. However, the described system is alternatively provided in a networked server system. Yet other possible configurations will be contemplated by those skilled in the art in view of the description of the preferred embodiment of the present invention. A printing system 1 includes a print engine 2 for maintaining and controlling a User Dialog 4 wherein a user selects from various print options such as a date range for outputting schedule information, a print layout from a set of print layouts 6, and a page format from a set of page formats 8 maintained by the print system 1. The user is also provided the option of generating output to a printer 28 or a display screen 30 (preview mode).

The set of print layouts 6 (described below in conjunction with FIG. 2), provide high level descriptions of graphical objects and text on a page. In the preferred embodiment of the invention, each print layout in the set of print layouts 6 is stored in a file having a "PRT" extension for easy identification. The set of page formats 8 (described below in conjunction with FIG. 4), define a plan for arranging one or more virtual pages on a physical page. While the invention is not so limited, each page format specifies a set of values describing the locations of virtual pages (up to four per side) on a physical page. In the preferred embodiment of the invention, each page format in the set of page formats 8 is stored in a file having an "FMT" extension.

When a user of the Schedule+application edits an appointment calendar, tasklist, etc. this information is stored in a user file. Such files are stored in a set of user files 10 identified by an "SCD" extension. A user file is selected from the Set of User Files 10 before the User Dialog 4 is invoked and therefore the set of user files 10 are not presented to a user through the User Dialog 4. The steps performed by the printing system 1 to display or output information from a current user file according to a selected combination of a print layout and a page format are described below.

The printing engine 2 also includes a parser 12 for converting data contained in a selected print layout and a selected page format into readily usable information by the print objects. The parser 12 creates vpage and vpageinfo data structures, illustratively depicted in FIGS. 9 and 10, from the selected page format. The parser 12 also converts print object entries in the selected print layout into pageinfo data structures corresponding to each page defined in the selected print layout. The pageinfo includes a list of print objects created by the parser 12 in accordance with specified ones of the print object classes defined in the object classes 14 (having a class structure of the type summarized in FIG. 5). The user dialog selections, vpageinfo and pageinfo structures are incorporated into a VIEW INFORMATION structure 16 that is illustratively depicted in FIG. 13.

In addition to the print object classes, the object classes 14 include a catch-all object class that provides a catch-all buffer plan for creating output data buffers, filling the data buffers with output data, and algorithms for outputting their contents within one or more regions defined by overflow print objects (described in FIG. 3) possibly spanning multiple virtual pages. A print object may designate a catch-all object as a destination for data that will not fit within a specified rectangle associated with the print object. Certain print object types such as APPOINTMENTS, TASKS, TASKLIST, EVENTS, and CARDLIST (described below in FIG. 3) always output their data to a catch-all object in order to take advantage of the capability of a catch-all object to automatically spill over to a nexu virtual page in order to complete the printing of a specified output.

A layout page may include several catch-all objects associated with specified areas of the layout page (specified by an overflow print object specifying the catch-all object). In an embodiment of the present invention, data that does not fit into the area of a layout page specified by the overflow print object is passed into another catch-all object. By giving catch-all objects unique names, catch-all objects may pass their non-printed data to a specified catch-all object. The structure of the catch-all object class is described below in FIG. 6.

The print engine 2 maintains a list of all catch-all objects. The catch-all objects include named catch-all objects referenced by print objects and a default (un-named) catch-all object. When a print object needs access to a catch-all object (to either add or remove data), the print object calls an application program interface in order to obtain a pointer to the catch-all object. If the print object references a catch-all object that has not yet been created, the catch-all object is created and a pointer to the catch-all object is returned to the print object.

The printing system 1 also includes a printer object class 18 providing a plan for the creation of a printer object 20 by the print engine 2. The printer object class 18 (summarized in FIG. 8) comprises data structures and routines for defining a print device, creating virtual page objects 22 in accordance with a virtual page object class 24 (summarized in FIG. 9), and accessing the virtual page objects 22. The virtual page objects 22 each describe a single virtual page. Each virtual page object includes a set of routines called by the print objects of the pageinfo lists within the VIEW INFORMATION 16 in order to render the graphical and text images associated with the print objects listed for a page defined in a print layout.

An Executor 26 controls the creation and printing out of physical pages of selected information according to the parsed VIEW INFORMATION generated by the Parser 12 from a print layout and page format. The Executor 26, modelled as a state machine, passes through a series of states for printing out a page based upon the parsed information stored in the VIEW INFORMATION. A description of the steps performed by the Executor 26 is provided below in conjunction with FIG. 15.

It is noted that schedule printing system for Microsoft's Schedule+7.0, the preferred embodiment of the present invention, can run on a stand alone personal computer system. In such a system, commands are submitted to the print engine 2 by means of a user input device 32 such as a keyboard, mouse or trackball. However, in other embodiments, the commands are received by the print engine 2 by means of a network link from a networked personal computer. Similarly, the printer 28 may represent a directly coupled, dedicated printer, or alternatively a networked printer coupled to a personal computer wherein the print system resides via a network link such as an Ethernet link.

The incorporation of an object oriented programming architecture into the print system 1 provides a number of advantages over other programming approaches when programming new views for a schedule creation and printing application such as Microsoft's well known Schedule+. Old objects can be modified, and new objects can be added (such as new print objects) without changing the operations and interfaces of the other pre-existing objects. Thus, the object oriented print engine 2 comprising print object classes 14 (including the Catch-all object class), printer object class 18, and virtual page object class 24 provide print object designers and view designers an easy means to construct views, define routing, and control flow of object, text and graphical data.

Another advantage of the preferred embodiment of the present invention is that new print layouts are relatively easy to define due to the simple format for describing a layout by specifying a set of print objects and a small set of parameter values for the set of print objects. Furthermore, the defined print layouts are adaptable to a variety of pre-defined page formats since dimensions and locations are specified in relative, rather than absolute units.

A print layout file defines a particular view of schedule data within a page. Turning now to FIG. 2, a schematic drawing depicts the contents of a print layout 50 specifying a set of items to be included in a page and the relative positions of the items within the page. In a preferred embodiment of the present invention, the print layout 50 comprises a text file beginning with the keyword "VIEW". The text file format of the print layout 50 facilitates easy viewing and editing of the print layout 50 by a print layout designer.

The first portion 52 of the print layout 50 comprises basic information including: a view name 54, a preferred page format 56, a view type 58, and meta-page dimensions 60. In the preferred embodiment of the present invention, the print system provides access by a user to a variety of selections from the set of print layouts 6. In order to facilitate distinguishing between the various ones of the set of print layouts 6, the print layout 50 includes the view name 54 comprising a character string distinctly identifying the print layout 50 in a list of available print layouts. The print layout also includes the preferred page format 56 that identifies the preferred page format (described below) for use in conjunction with the print layout 50. The preferred page format 56 need not designate a file. In such instances, the printing engine selects a default format from a list of page formats.

The view type 58 in the preferred embodiment of the present invention is designated as: DAILY, WORKWEEKLY, WEEKLY, MONTHLY, or ALL. The view type value is used to increment the dates applied to iterations of processing a single layout page in a range of dates specified by a user. The default value is DAILY. A DAILY view prints a view representing a single day on a virtual page. Therefore, after the print system 1 has processed the layout page a first time for a range of dates entered by a user, the next time the layout page is processed the date will be incremented by one day. A WEEKLY view prints a view representing a week within a single layout page, beginning with Sunday. A WORKWEEKLY view represents a partial week of days beginning with Monday and ending on Friday, but omits Saturday and Sunday. A MONTHLY view represents a month, beginning with the first day of an identified month. The ALL view type represents an entire date range designated by a user within a single page. The ALL view is a primarily used to show a set of data (e.g., appointments or tasks) that are pending for the entire date range submitted by a user.

The meta-page dimensions 60 include two (2) integers describing the "size" of the page. It is noted however, that the actual size of the printed view is determined by the physical dimensions of a page defined in a page format file described below. The integer values in the meta-page dimensions 60 define the relative size of displayed objects defined in meta-dimension units with respect to the overall size of the layout page. The default values for the meta-page dimensions are 100×100. In such a case, the point "50,50" corresponds to the center of the layout page.

In the preferred embodiment of the present invention, the print layout 50 is stored in a file beginning with the word "VIEW" followed on the same line by: the view name 54, the preferred page format 56, the view type 58 and the meta-page dimensions 60. Each value is separated from other values by a comma. In the event that a value is not specified (in order to indicate a preference for a default value), a comma is still inserted as a place holder unless no other values are provided in the line.

The following is an example of a first line of a print layout file:

VIEW "My View", "Letter", DAILY, 100, 100

Because the DAILY and 100, 100 values are default values, the values and their associated commas can be omitted. Thus, the above example can also be specified by the line of text:

VIEW "My View", "Letter"

and the same results as the previous example text are obtained.

The print layout 50 specifies a set of layout page descriptions including print objects and associated properties further defining the print objects. The print objects each have unique characteristics defined by attributes and associated program code that is executed in order to display schedule information, display an image, and/or deposit information into a buffer associated with the print object. Turning briefly to FIG. 2a, each object line entry within the set of displayed objects, such as object line entry 64, begins with the text string "OBJECT" in order to identify the beginning of a print object line entry. A DLL name 66 may follow the "OBJECT" text string in the object line entry. If no DLL name is specified, then the schedule printing engine accesses the class hierarchy for the built-in print object classes containing the information needed to create a built-in print object according to a print object class definition (in the print object classes 14) corresponding to a print object identified by a print object name 68. Each type of printable object is uniquely identified by a unique combination of the DLL name 66 and the print object name 68. The print objects may merely deposit information into a buffer. However, if a print object instead specifies displayed information, the relative location of the information within a layout page is specified by a left side 70, top 72, right side 74 and a bottom 76. Collectively these values specifying a rectangle on the layout page are referred to as rectangle meta-dimensions 78.

Properties for a displayed object, to the extent properties are designated, are defined in property line entries, one property per line entry, following the object line entry. Returning to FIG. 2, the object line entry 64 is followed by a property line entry 80. The property line entry 80 is preferably indented in order to make the set of displayed objects and associated properties more readable. Turning briefly to FIG. 2b, each property line entry begins with a property type 82 for indicating one of a number of defined properties (described below). The property type 82 is followed by property attributes 84 specifying the actual properties of the associated displayed object identified in the object line entry 64. The defined properties and their associated attributes are described below in conjunction with a description of the pre-defined object types listed in the left column of a table depicted in FIG. 3.

The print layout 50 may also define additional pages by separating a first page of objects from a second page by a PAGE command 86. Printable objects in the print layout 50 after the PAGE command 86 are placed within the next available virtual page. However, the date (or range of dates) assigned to the separate virtual page will be the same as the first virtual page.

An OVERFLOW command 88 (not to be confused with overflow objects and overflow properties) may be inserted into the print layout 50 before the first object line entry for a layout page description in order to create a repeating virtual page that will continue onto subsequent virtual pages until all items defined on the layout page are printed. The OVERFLOW command 88 is typically specified when the print layout 50 includes an overflow object (described below).

Turning to FIG. 3, the illustrated table lists object types and their associated mandatory properties (denoted by an "M") and optional properties (denoted by an "O"). It is noted however, that additional objects can be defined and stored in dynamically linked library files for incorporation at run-time by the schedule printing engine according to well-known dynamically linked library ("DLL") file incorporation procedures. It is also noted that while the presently preferred embodiment is a printing engine for a schedule/planner application, the present invention is applicable to a broad spectrum of applications where forms are designed and generated from an extensible set of display element objects. In the other applications, an alternative set of built-in objects and associated properties may be defined.

The list of pre-defined ("built-in") objects includes a LINE object 90 for instructing the printing engine to place a line on a layout page corresponding to a diagonal of a rectangle designated by the left, top, right and bottom sections in a LINE object entry. An example of a LINE object entry is:

"OBJECT, LINE, 10, 5, 20, 15"

that results in a line from point (10,5) to (20,15) on the layout page. As shown in FIG. 3, the line object 90 has no associated properties.

A RECTANGLE object 92 causes a rectangle to be placed on the layout page at the locations specified by the rectangle meta-dimensions 78. An OPTIONS property is an object type-specific property for specifying object type-specific attributes. The attributes specified in an OPTIONS property are interpreted according to the type of the object with which the OPTIONS property is associated. In the case of the RECTANGLE object 92, the OPTIONS property, an optional property, specifies whether the color of the rectangle is "black", "gray", or "frame" (a black line around the perimeter of the rectangle). If the OPTIONS property is not specified for the RECTANGLE object 92, the default, "frame" is applied.

A TEXT object 94 enables a user to specify a line of text at a specified area of the layout page defined in the object line entry. A VALUE property is always designated for the TEXT object 94 that defines text that is to be inserted in the area of the layout page defined by the TEXT object 94.

The VALUE property may include variable names, preceded by an "&" for which an appropriate text string is inserted during printing. Examples of such variables are "&USERNAME", "&CURDATE", and "&CURTIME" which instruct the print system 1 to print a user's name, current date, and current time respectively during print time in accordance with a current value of the designated variable name. Additional variables will be known to those skilled in the art. An example of a VALUE property for a TEXT object is:

VALUE "This is the Schedule for &USERNAME."

A STYLES property must accompany the TEXT object 94 in order to designate one or more "styles" that are to be used by the print system 1 when preparing text for printing. Styles are defined in Page Format files (described below in conjunction with FIG. 4) and include a font name, font family, point size, and possibly other well known style attributes. The selection of a style, especially font size, is significantly influenced by the actual page size selected by a user for printing a page. Therefore, the styles identified by the Style property for a TEXT object are not concretely defined in the print layout 50. Rather, the styles identified in the print layout 50 are correlated with actual style definitions within a page format file. The format of a STYLES property is:

STYLES {style1}, {style2}, . . . , {styleN} that designates N style names for use in printing out text within an associated TEXT object. As explained above, each of the named styles must be separately defined in a Page Format file used to print out the print layout 50. It is further noted that a TEXT object needs only one style name within a STYLES property. Other object types described below such as a TASK object (three styles) require more.

A print date is associated with each output page. The TEXT object 94, as well as other objects, may use a print date to output information. For example, if a page represents a single day (a DAILY view), then the first page output by the printing engine will correspond to a first day in a range specified by a user, and subsequent printed pages will be incremented by one day for each additional page printed until the final specified day is printed.

The print date assigned to a printed page, as the example in the above paragraph illustrates, can be modified "daily" by the printing engine 2 on a per instance basis. In fact, the capabilities are extended to a weekly, a monthly or a yearly basis per instance of a print object on a printed page by designating a DELTAYMD property for the print object, such as the TEXT object 94. The DELTAYMD property also includes a "count" value (positive or negative) that causes the printing engine 2 to increment or decrement the date for the print object in relation to the current date for the printed page by the specified count according to the specified units (days, weeks, months, years). For example, a print object associated with the fifth day for a week view on a printed page can designate that particular day by specifying an increment value of four days from the date assigned to the printed page. The format of the DELTAYMD property is:

DELTAYMD {count}, DAY/WEEK/MONTH/or YEAR.

To print out a series of pages within a range with each page starting a new week, the specified DELTAYMD property would be: "DELTAYMD 1, WEEK."

The TEXT OBJECT 94 may also include a DATEFMT property that defines the manner in which a date will appear when it appears in the text. The format of the DATEFMT property is: "DATE {string}." The string comprises a set of characters describing whether to print the weekday, numerical day of month, month, and/or year. The string also describes the manner in which the individual elements are printed. Table 1, below, describes the codes inserted in the "string" describing a date format.

TABLE 1

| Specifier | Item  | Values           |
|-----------|-------|------------------|
| M         | Month | 1–12             |
| MM        | Month | 01–12            |
| MMM       | Month | Jan–Dec          |
| MMMM      | Month | January–December |
| d         | Day   | 1–31             |
| dd        | Day   | 01–31            |
| ddd       | Day   | Mon–Sun          |
| dddd      | Day   | Monday–Sunday    |
| yy        | Year  | 00–99            |
| yyyy      | Year  | 1900–2040        |

An example date format string and corresponding output is: "MMMM d, yyyy" that results in the printing engine 2 printing "Apr. 18, 1996" when a variable asking for the current date is specified in a corresponding TEXT object.

The TEXT object 94 also may have associated with it a TIMEFMT property describing the manner in which the printing engine will present a time on a page in accordance with a time variable contained in a TEXT object. The TIMEFMT property is presented in the form: "TIME {format number}, {separator string}." The format number identifies one of several possible formats for printing a time on a page. For example, "0" causes a standard print out of the time (i.e., 3:45 PM or 15:45 hrs), "1" prints out the time without the trailer (i.e., 3:45 or 15:45), and "2" prints out a modified standard format where the AM/PM trailer is only included in the first entry in the morning or afternoon in the 12 hour format or only the first entry in the 24 hour format. Format number "3" results in only the hour being printed out, and format number "4" causes printing of the hours and minutes when the minutes do not equal "00" and only the hour when the minutes equal "00."

The TEXT object 94 has three non-mandatory OPTIONS properties: Horizontal Justification, Vertical Justification, and Ellipsis. The Horizontal Justification option may designate HCENTER, LEFT or RIGHT justification. The Vertical Justification option may designate VCENTER or NONE. Finally the Ellipses option has a value of ELLIPSIS or NONE. Designation of the ELLIPSIS option causes the printing engine 2 to print an ellipsis at the end of a string if the entire string does not fit within the area prescribed by the TEXT object 94.

A CALENDAR object 96 prints a small calendar for the current print date. The size of the calendar is determined by the rectangle defined by the rectangle meta-dimensions 78 within a "CALENDAR" object line entry in the set of displayed objects. The CALENDAR object 96 must have an associated STYLE property (described above) describing the applicable calendar text style. The above described DELTAYMD property may be included to further define the CALENDAR object 96. The CALENDAR object 96 includes a single numeric OPTION property controlling highlighting of dates within the calendar. The OPTION property, if equal to "0" specifies that the printing engine 2 should never highlight the calendar. A value of "1" requests highlighting today's date only. A value of "2" requests highlighting of the "current" date. Note that the current date refers to the date associated with a particular page, and that the current date is modified on subsequent pages based upon the DELTAYMD property for the CALENDAR object 96.

The MONTH object 98 prints a monthly calendar within a rectangle defined by the rectangle meta-dimensions 78 within a "MONTH" object line entry in the set of displayed objects. The month printed is based upon the current print date and includes the appointments for each day of the month. Each appointment includes a start time, an end time, and text associated with the appointment. A STYLES property, identifying three styles, must be designated for the MONTH object 98. The first style is used for the appointment text, the second style is used for the times, and the third value is used to print headers for the month object 98.

In addition to the mandatory STYLES property, optional properties that may also be designated in order to define a MONTH object 98 include the DELTAYMD and RANGE properties. A RANGE property specifies a start and stop time for printing out a particular associated object. The RANGE property is defined according to the following format: "RANGE AFTER, {time 1}, AND/OR, BEFORE, {time 2}"—where time 1 and time 2 are specified in the 24 hour day format with a colon separating the hour from the minutes.

The text strings "STARTTIME" and "ENDTIME" may be inserted in the {time 1} and {time 2} slots in a RANGE property line entry instead of actual times. The values corresponding to these variables are retrieved from a user preferences structure. An example of a RANGE property utilizing these variables is "RANGE BEFORE, STARTTIME, OR AFTER, ENDTIME." When the PRT file is processed the STARTTIME and ENDTIME cause the print system to access the pre-stored values corresponding to these variables. When a user wishes to modify such views to reflect a changed STARTTIME or ENDTIME, the user may modify the variables via the User Dialog 4.

A closed end range is specified by identifying a relatively earlier time for time 1, specifying the "AND" logical connector, and specifying a relatively later time for time 2. For example: "RANGE AFTER, 9:00, AND, BEFORE 17:00 represents a business hours range. A fragmented range is obtained by specifying a later time for time 1, specifying the "OR" logical connector, and specifying an earlier time for time 2. For example: "RANGE AFTER, 17:00, OR, BEFORE 9:00 represents non-business hours. When used in conjunction with the MONTH object 98, the RANGE property designates the portion of the day for which the printing engine 2 prints appointments. In general, the RANGE property is applicable for any printable object which includes printed appointments.

The TIMEFMT property, described above, may also be designated for the MONTH object 98 in order to specify how the printing engine 2 prints appointment times. Furthermore, an OVERFLOW property may be associated with a MONTH object 98. The purpose of the OVERFLOW designation is to identify a buffer (referred herein as a "catch-all") into which "overflow text" (i.e., text which will not fit into its allocated space in a particular view) is deposited. The format of the OVERFLOW property is: "OVERFLOW {string}"—where the string explicitly identifies a catch-all buffer.

A SCHEDULE object 100 prints a view of a day's appointments within a rectangle designated by the rectangle meta-dimensions 78. This view is similar to what is typically found in an appointment book. However, the SCHEDULE object 100 does not list times down the side of the page. A STYLES property must be provided for the SCHEDULE object 100 that contains a first style for the appointment text and a second style for the time of the appointments. A view designer may optionally designate DELTAYMD, RANGE, TIMEFMT and OVERFLOW properties in the manner and for the purposes described above. However, the RANGE property must specify the "AND" logical connector.

The OPTIONS property for the SCHEDULE object 100 must specify values for the following parameters: Overlap, Scale, Location, Overflow Behavior and Heading. The Overlap option specifies the number of permitted overlapping appointments in the output. The maximum permitted by the preferred embodiment of the invention is 16. Appointments pushed out of the printed schedule, due to excess overlap, are placed within a catch-all buffer that may be designated by the OVERFLOW property for the SCHEDULE object 100.

The Scale option specifies the time period represented by each of the slots on the page. The default value is a half hour, however, the user may alternatively designate a quarter hour or one hour. The Location option instructs the print engine to print a location where the appointment is to take place. Appointments bumped into a catch-all buffer will be printed with the location as well. The Throwall option instructs the printing engine 2 whether to place all unprinted information in a catch-all buffer. The Heading option, if assigned a value greater than zero, instructs the printing engine 2 to print a heading to a catch-all buffer before any overflow appointment text. The assigned number of the Heading option designates the thickness of the line preceding the heading text. In the preferred embodiment of the present invention, the heading text is always "Other Appointments."

A TIMEFRAME object 102 prints a list of times down the side of the virtual page. The STYLES property must designate a style for printing the times. The RANGE property is optional and designates the time segment to be covered in the list of times printed along the side of the virtual page. A single, mandatory option specifies the period between listed times (quarter hour, half hour, and hour).

The APPOINTMENTS object 104 places all appointments in a specified date and time range within a catch-all buffer which may be specified by the OVERFLOW property. This enables a set of appointments to be printed continuously and in their entirety over a series of pages using an OVERFLOW object 116 (described below). The STYLES property for the APPOINTMENTS object 104 must designate a first style for appointment text and a second style for the time of the appointments described by the appointment text.

The OPTIONS property must designate values for the parameters: Location, Break, SingleDayOnly and Heading. The Location option enables/disables printing out the location of an appointment, if provided. The Break option causes the printing engine 2 to insert page breaks at the end of each day (DAY) or week (WEEK). The SingleDayOnly option, if equal to "1" indicates the appointments described in the catch-all buffer are for a single day. A value of "0" indicates that the printing engine may place more than a single day of appointments in the catch-all buffer. The Heading option associated with the APPOINTMENTS object 104 is similar to the Heading option of the SCHEDULE object 102. However, if the catch-all buffer already contains text, the printing engine 2 does not insert a heading in the catch-all buffer.

The DELTAYMD property, the RANGE property, the DATEFMT, and the TIMEFMT properties may also be defined for the APPOINTMENTS object 104. These properties have been previously described, and since their purpose and function in further defining the APPOINTMENTS object 104 is the same as their above description, their description will not be repeated.

A TASKS object 106 instructs the print system 1 to place all the text needed to show a task list in a catch-all buffer which may be designated using the OVERFLOW property. The task list is a data structure comprising a list of jobs to be completed by a user and the associated due dates. The task list may be filtered to provide a list of only those tasks meeting a filter criteria. In the preferred embodiment of the invention, the specifiable filter values include "all tasks", "upcoming tasks", and "overdue tasks". The printing system 1 is also capable of outlining the tasks according to a designated scheme such as priority.

The TASKS object 106 must designate three styles within the STYLES property. The first style is used to print the text for tasks which are not overdue. The second style defines the appearance of the text of overdue tasks, and the third style is used for text associated with projects.

The OPTIONS property for the TASKS object 106 must designate values for the parameters: Minimal, Outline Level, and Heading. A Minimal flag specifies whether the printing engine 2 should include the minimum fields (e.g., priority, text, and end date). If the Minimum flag is not set, then the standard fields for task elements in the task list are included in the output created by the printing engine. The Outline Level parameter specifies outline level of the task list where a line is inserted. A value of "1" designates inserting a line at the beginning of each top level of the outlined tasks. A value of "0" suppresses printing of a line across a new level. The Heading option is similar to the previously described Heading option for the SCHEDULE object 100.

A TASKLIST object 108 places all tasks into a catch-all buffer. The name of the catch-all buffer is designated in the OVERFLOW property associated with the TASKLIST object 108. Each individual task will itself contain a sub-list corresponding to the columns in a task grid. The headings associated with the columns include information relating to a task such as, for example, "Text:" describing the task, "Priority", due date, etc. Other suitable column headings may be added as deemed necessary or desirable for a particular application.

The TASKLIST object 108 has associated with it a mandatory OPTIONS property including a NOHEADER option and a Break option for which values must be supplied. The NOHEADER option specifies whether the headings associated with columns (e.g., "Text:") for the task grid will be printed next to a line in a task sub-list having that particular information type. The Break option specifies whether a page break is inserted after each listed task. Finally, the STYLES property for the TASKLIST object 108 must designate a first style for printing text and a second style for printing headings for sub-list lines in the event that the NOHEADER option specifies printing the headings.

A BITMAP object 110 prints a designated graphical image scaled and stretched to fit within the dimensions of a rectangle specified by the rectangle meta-dimensions 78. The VALUE property, the only applicable property for a BITMAP object 110, is a string identifying a file containing the bitmap.

An EVENTS object 112 places a list of events into a catch-all buffer. The name of the catch-all buffer may be designated in the OVERFLOW property associated with the EVENTS object 112. The STYLES property must designate a first style for printing event text and a second style for printing dates associated with the events. While not mandatory, the OPTIONS property may designate a Heading option value. The Heading option, if assigned a value greater than zero, instructs the printing engine 2 to print a heading to the catch-all buffer before any event text. The assigned number of the Heading option designates the thickness of the line preceding the heading text. In the preferred embodiment of the present invention, the heading text is always "Events." The OPTIONS property may designate a SingleDayOnly option. The SingleDayOnly option, if equal to "1" indicates the event information placed in the catch-all buffer are for a single day. A value of "0" indicates that the printing engine may place more than a single day of events in the catch-all buffer.

The EVENTS object 112 may also be further modified by designating DELTAYMD, RANGE, and DATEFMT properties. The format and function of these options are described above. Therefore a detailed description of these three properties will not be repeated here in conjunction with the description of the EVENTS object 112.

A CARDLIST 114 object places a list of contacts into a catch-all buffer. The name of the catch-all buffer may be explicitly designated in the OVERFLOW property associated with the CARDLIST object 114. Each individual card will itself contain a sub-list corresponding to the columns in a cardlist grid. The headings associated with the columns include information relating to a contact card such as, for example, "Name", "Phone Number", "Address", etc.

The CARDLIST object 114 has associated with it an OPTIONS property including a NOHEADER option and a Break option for which values may be supplied. The NOHEADER option specifies whether the headings associated with columns (e.g., "NAME") for the cardlist grid will be printed next to a line in a task sub-list having that particular information type. The Break option specifies whether a page break is inserted after each listed card. Finally, the STYLES property for the CARDLIST object 114 must designate a first style for printing text, a second style for printing headings for sub-list lines in the event that the NOHEADER option specifies printing the headings, and a third style for printing outline text (i.e., the text describing a particular group of lines in an outline view).

An OVERFLOW object 116, not to be confused with the overflow property that merely designates a name for a catch-all buffer, actually prints out the items placed in a catch-all buffer by various ones of the above described objects on the current virtual page (and possibly objects from previous virtual pages, if the items were not explicitly deleted). The overflow property may explicitly designate a catch-all buffer from which the OVERFLOW object 116 will extract information for printing on a virtual page. While, the OVERFLOW object 116 uses the overflow property to designate a catch-all buffer from which information is extracted, in an alternative embodiment of the present invention, an additional field is provided enabling the OVERFLOW object 116 to explicitly designate an overflow buffer into which unprinted data is deposited when the rectangle allocated to the OVERFLOW object 116 is filled and additional data remains in its associated catch-all buffer.

Three option values must be defined in the OPTIONS property for the OVERFLOW object 116. The first option, designated as FULL or MINIMAL, will cause the printing engine 2 to print out the full text of each item in a specified catch-all buffer for the OVERFLOW object 116 until the space allocated to the OVERFLOW object 116 is completely consumed when the FULL value is specified. If the MINIMAL value is specified, then each item is limited to a defined number of lines. Appointment items are allocated two lines, and Task items are limited to a single line. In MINIMAL mode, an ellipsis is inserted at the end of the last line of an item.

The second option, designated as CLEAR or CONSUME, will cause the printing engine 2 to discard any unprinted items and text. If CLEAR is specified, then any unprinted items and text are discarded when a new virtual page is started. If the CONSUME value is specified, then unprinted items and text are discarded after the rectangle specified by the OVERFLOW object 116 is filled. The CONSUME value is desirable when multiple unrelated OVERFLOW objects 116 exist on a single layout page. If neither CLEAR nor CONSUME are designated, any unprinted items in the catch-all buffer named in the overflow property field of the OVERFLOW object 116 are carried over to the next page.

The third option, specifies how far to shift text within a horizontal line. This option enables both text and heading or task horizontal graphical lines in a same file. The shift is applied only to the text while the horizontal graphical lines are not shifted.

The STYLES property, though not mandatory, may designate a style for printing "More Items . . . " in the case where the OVERFLOW object 116 is unable to print all of the catch-all buffer information within the rectangle designated by the OVERFLOW object 116. The STYLE property is preferably designated only when the MINIMAL option is specified along with either the CLEAR or CONSUME options selected in order to indicate on the printed page that a portion of the catch-all buffer data was not printed.

A DLL object 118 provides extensible platform for augmenting the set of built-in print objects. A single DLL may contain several print objects. The print object name and external DLL name are specified in a print layout file. Each DLL providing a print object definition includes a print object creation routine. The DLL object 118 properties and behavior are defined by the individual DLL files.

Turning now to FIG. 4, a page format 120 specifies logical dimensions of a physical page. In addition, the page format 120 defines a virtual page size in the logical units of the physical page, and then defines a set of virtual pages and their location on the physical page in logical units. The page format 120 is also specified by text in order to facilitate easy review and editing by a designer of page formats.

A Format Header 122 comprises a Format line 124, Margins line 126, a Font Size line 128, Hints line 130, and Page Size line 132. In the preferred embodiment of the present invention, each of the above listed sections of the Format Header 122 must be present and provided in the order listed above.

The Format line 124 specifies a page format name within quotation marks. The page format name is followed by dimensions of a physical page provided in terms of logical units. The dimensions represent the portion of the physical page within the margins. The Format line 124 also may include a Portrait/Landscape mode control value. The default value if none is specified is Portrait mode. If Landscape is designated, the print image is rotated 90 degrees on the paper. The Portrait/Landscape mode control is a print layout design aid which makes creation of a complementary view relatively simple after a first view is created in either the portrait or landscape mode by replacing the original layout mode designation by the complementary layout mode.

The Margins line 126 specifies a set of default margins for the physical page. A first entry in the Margins line 126 specifies the units of measure (inches, centimeters, etc.) for interpreting the subsequent designated margins. Next, the Margins line 126 contains values for the Top, Left, Right, and Bottom margins. The margin values are represented by two numbers, one to the left of a decimal point and a second to the right of the decimal point. An optional entry in the Margins line 126 specifies MIRROR margins. When MIRROR margins are indicated, when duplex printing is specified, the values for the side margins are switched after each physical page side.

The Font Size line 128 is a single value indicating the preferred size for text on the page. A value of "0" indicates small, a value of "1" corresponds to medium size text, and a value of "2" indicates a preference for large text. A user overrides this preference by specifying a new font size for a print object.

The Hints line 130 is an extensible list of options for specifying a page format. For example, the presently preferred embodiment includes a duplex (i.e., two-sided) printing mode page format variable. A value of "0" indicates no preference, a value of "1" indicates long-side duplex, and a value of "2" indicates short-side duplex.

The Page Size line 132 specifies the size of each virtual page on the physical page, in logical units. A page format may have multiple virtual pages on a single physical page. However, in the preferred embodiment of the invention, all of the virtual pages are the same size.

Style definitions 134 are included after the format header 122 in the page format 120 to concretely define styles named in the print layout 50. A page format must include the set of styles in a view described in the print layout 50. The Style definitions begin with the keyword "STYLE". The keyword "STYLE" is followed by a first style definition having a format illustratively depicted in FIG. 4a. A style definition begins with a style name 136 which should correspond to a style name in a print layout 50. An example of a typical style name is "style1". A friendly style name 138 is a more descriptive name for the defined style. If no friendly style name is desired, "null" is specified. A font name 140 is specified in the event that the font is not one of the built-in fonts identified in the built-in font 142. In the preferred embodiment of the present invention, a page format designer may select from SWISS, ROMAN, MODERN, DECORATIVE, and DONTCARE choices in the built-in font 142. The default value, DONTCARE, results in selection of a default font associated with a currently selected printer. Next, the small font-size 144, medium font-size 146, and large font-size 148 are specified. The style is designated as bold or not bold in the Bold field 150. Italic style is designated in the Italic field 151. Underlined and strikeout text are designated in Underline field 152 and Strikeout field 153 respectively. Defaults for these fields render these style modifiers inactive (i.e, no bold, italicized, underlined, or strikeout).

A set of page descriptions 154 follow the style definitions 134. Each page description within the set of page descriptions 154 contains the sub-fields: Page 156, Pageinfo 158 and Invert 160 describing the position of a virtual page on a physical page. In the preferred embodiment of the present invention, up to four virtual pages can be placed upon a single side of a physical page. Thus, up to eight virtual pages can be described in the set of page descriptions 154 for a single duplex physical page. However, the choice of a limit for the number of virtual pages on a physical page side is merely a design choice and in no way limits the scope of the present invention.

The Page 156 sub-field contains the X and Y coordinates specifying the upper left-hand corner of the non-inverted virtual page on the logical page. A coordinate of (0,0) places the upper left corner of a non-inverted virtual page in the upper, left corner of the logical page.

The Page Info 158 is used to select and place a virtual page on a side of a physical page. A first entry of the Page Info 158 designates the page order number of the described virtual page when the page format is used to print a document in simplex mode. A second entry of the Page Info 158 designates the page order number of the described virtual page when the page format is used to print a document in duplex mode. A third entry of the Page Info 158 designates the side the physical page for which the description is provided (0=front, 1=back). If a page described in the page format 120 is intended to be placed only on the second side of a duplex page (i.e., the third entry equals "1"), then the first entry must be zero in order to ensure that this page definition is not used when simplex mode printing is designated by a user.

The Invert status 160 specifies whether the described page is to be inverted. A first value designates whether the page is inverted (i.e., turned up-side down) in the simplex page mode. A second value designates whether the page is inverted in the duplex page mode.

The following page description describes a "Normal" page.

Page 0,0
PageInfo 1,1,0
Invert 0,0

Such a virtual page is located in the upper left corner of a physical page, it is the first virtual page on the front side of a physical page in either simplex or duplex printing, and the page is never inverted.

The printing engine 2, embodying the C++ object oriented program architecture, creates each one of the print objects of the types described above in FIG. 3 according to the object plan specified for objects belonging to a "PRINTOBJ" general class and a particular sub-class structure associated with a specifically named print object type (e.g., "APPOINTMENTS"). Turning to FIG. 5, the "PRINTOBJ" class structure embodied within each one of the print objects (excluding the Catch-all object) is illustratively depicted. Each print object associated with the "PRINTOBJ" class includes a data section 200 for holding object related values inserted within the print object when the parser 12 creates the print object from an object line entry (e.g., line entry 64) and its associated property line entries (e.g., line entry 80) within the print layout 50. The remaining portion of the PRINTOBJ structure comprises a set of routines for creating a print object according to a specified print object and the passed values. A SetRect routine 202 is called by the Executor 26 in order to set the drawing area for the object within the physical page logical coordinate system. A GetRect routine 204 retrieves the drawing area assigned to the object. An Install routine 206 is an object-specific initialization routine used to initialize variables and data structures for a print object prior to calling upon the print object to perform another function. A Parse routine 208 is called by the parser 12 to convert an object line entry and its associated property line entries into the values stored in the data section 200.

Each print object also includes an Increment Image routine 210 that references the data describing the print object in the data section 200, references data in a currently selected user file on the current date (if necessary) and renders Lists of Extensible Graphical Objects (LEGOS) corresponding to the print object. LEGOs are described below. The LEGOs are stored on a virtual page object with which the print object is associated. An EndPage routine 212 is called by the Executor 26 in order to dispose the print object after the print object is no longer needed to render LEGOs to a virtual page object. In the preferred embodiment of the present invention, the print objects are recycled for later dates in a print range and therefore the EndPage routine 212 is performed after the entire print date range for a particular print job is exhausted.

The above described print object structures enable the print objects to render images to the printer object 20 instead of a specific device type. Printing to a specific output device type (e.g., a connected laser printer or a display screen) is accomplished within the printer object 20 by specifying a particular device defined by a "deviceinfo" structure and a device context. When a new output device type is added (e.g., an audio device) the printer object 20 is modified. However, the class definitions for the "PRINTOBJ" class and the sub-classes associated with the specific object types need not be modified to accommodate the new output device type.

It is noted that while the "PRINTOBJ" class definition provides each of the routines identified in FIG. 5, sub-classed print object class definitions for a particular print object type (e.g., "APPOINTMENTS") typically provide their own version of the Install routine, Parse routine, IncrImage routine, and EndPage routine in accordance with the unique print features provided by each of the print object types.

In the preferred embodiment of the present invention, a catch-all buffer is implemented in the form of the CATCH-ALL object class structure illustratively depicted in FIG. 6. Each catch-all object provides a set of data structures for maintaining a buffer of print elements passed to the catch-all object (stored as "catch objects" and referenced by "catch object elements"—both are described below) and a set of routines for administering the set of data structures. In particular, the catch-all object includes an Element Count 600 that contains the current number of catch object elements associated with the catch-all object. A Maximum Element Count 602 specifies the limit for the number of catch object elements that can be placed in a catch-all object.

Each catch-all object is associated with a list of catch object elements that in turn reference actual buffered catch objects. The list of buffered catch object elements is referenced by a Pointer to Element List 604. Each catch object element is stored as a separate data structure constructed according to a catch object element plan. The catch object element plan includes a length field identifying the total length from top to bottom needed on a layout page to print the catch object. A "printed" boolean variable indicates whether the catch object has been printed, and a pointer references the data portion of the catch object.

A catch-all object, with the exception of the default catch-all object, includes a name stored in a Catch-all Name field 606. Each catch-all object includes a Remove Printed Objects routine 608 for removing catch object elements corresponding to printed catch objects from the list of catch object elements referenced by the Pointer to Element List 604. An Add Element routine 610 adds a catch object element to the list of catch object elements referenced by the Pointer to Element List 604. A Clear Element List routine 612 removes all catch object elements from the list regardless of whether the objects have been printed.

A Render Catch Objects routine 614 renders as many of the buffered catch objects as possible in the order in which they are arranged (first in=first out) in the list of catch object elements. The Render Catch Objects routine 614 is passed a rectangle on a virtual page within which the buffered catch objects must fit, a render option to print the buffered data in either full, reduced, or minimal form, a print style to use when printing buffered text, and an amount to shift the printed information on a line (for indenting). The steps performed by the Render Catch Objects routine 614 are summarized in FIG. 16 described below.

The catch-all objects are capable of spilling their unprinted catch objects to a next catch-all object. This function is accomplished by a Move Unprinted Catch Objects routine 616 which transfers the unprinted catch objects to a named catch-all object. If no name is specified, then the unprinted catch objects are moved to a default catch-all object.

Each catch-all object also includes a Has Text routine 618 for ascertaining whether any of the catch object elements associated with a catch-all object are text catch object elements. A Catch-all Empty routine 620 indicates whether the catch-all object is empty. Yet another function, a Provide Catch-all Name function 622 returns the name of the catch-all object. This function is used to locate a particular catch-all object.

The catch-all object class structure also includes a set of routines for adding particular types of catch object elements to the list of catch object elements. An Add Text routine 624 adds a text list element to the catch-all object. An Add List Item routine 626 adds a catch object element referencing a list item, comprising an item name and associated data, to the list of catch object elements. An Add Page Break routine 628 and an Add Vertical Space routine 630, and an Add Graphic Line routine 632 respectively add catch object elements corresponding to catch objects for page breaks, vertical page spacing, and graphic lines of a specified thickness.

Turning now to FIG. 7, the catch object class structure is illustratively depicted. A Vertical Space field 640 specifies the vertical space on a virtual page needed to render the remaining unprinted portion of the catch object. The print data of a catch object can be separated into multiple output overflow rectangles. However, the data has some minimum space requirements for outputting a next portion of the print data. A Minimum Vertical Increment field 642 provides the minimum vertical space on the virtual page required by the catch object to display the next dividable sub-section of the catch object data.

An Increment Image routine 644 in the catch object renders unprinted print data into a rectangle specified when the Increment Image routine 644 is invoked by the Render Catch objects routine 614. A Spacing Status routine 646 returns a boolean value indicating whether the catch object is merely a vertical spacing object which is disregarded when an overflow rectangle is filled even if the overflow rectangle did not consume the entire vertical space designated by the catch object.

In the preferred embodiment of the invention, specific catch object classes are sub-classed from the above described catch object class. These sub-classes include one additional, sub-class specific, routine for referencing information associated with the particular sub-class catch object. The sub-classes are thus defined to reference text, list items, page breaks, vertical spaces, and graphical lines. In other embodiments of the invention, this capability may be extended by defining additional/alternative catch object subclasses for referencing other items such as bitmap graphics and complex arrangements of text similar to list items.

The printer object 20 is created according to the class definition summarized in FIG. 8. While referred to as a "printer object," the output device corresponding to the printer object 20 may be any of a number of different output devices including a display screen for previewing an output page. The printer object class definition is output device-independent. The printer object class definition is combined with specific device context information for a designated device context in order to define a printer object for a specific output device.

The printer object class definition includes a data section 220 defining an output device. The values stored in the data section 220 for a printer object 20 include print style descriptions, font descriptions, the current font, number of logical pixels per inch, a list of virtual pages, and current virtual page. The printer object class definition also includes a set of internal utility routines 222 enabling a process calling the printer object 20 to add a font to the current set of fonts associated with the printer object, get a style or font index, select a particular style, set internal indices for the styles and fonts, and obtain font size information.

The printer object class definition also includes a set of routines which are invoked by other processes. In particular, a CurrentVirtPage routine 224 returns an address for the current virtual page to a calling process. A VirtPageCnt routine 226 returns the total number of virtual pages on the single page. A SetDeviceContext routine 228 sets the printer object to print to a particular output device. A GetDeviceContext routine 230 returns the identity of the currently selected output device. A SetCurrVirtPage routine 232 sets the number of the current virtual page accessed by the printer object. A ParseStyle routine 234 is used by the print layout parsing routine. When a style property is encountered while a print layout is parsed, the parse style routine in the printer object locates the style and returns a style ID assigned to the particular style. An AddStyle routine 236 adds a style definition specified by a selected page format to the data section 220. In particular, the AddStyle routine 236 parses a style definition (See FIG. 4a) from a page format and stores the resulting style definition within the data section 220 of the printer object 20.

The printer object class definition also includes a Device Install routine 238 that initializes the printer object 20 with values provided by an identified "deviceinfo" structure that includes, in the case of a screen display device, the number of pixels per logical inch on a display device, the width and height of the display screen. Otherwise the deviceinfo includes the physical page dimensions in device units (according to well known WINDOWS (TM Microsoft Corporation) specification parameters. A boolean value identifies whether the device supports HP-type DRAWPATTERNRECT escape calls.

A CreateVirtualPages routine 240 creates virtual page objects (described below) corresponding to each of the virtual pages defined in a currently accessed print layout. After the virtual pages have been created a Render routine 242 drives the final rendering of data from the virtual pages to the selected output device. After a print job is complete for a physical page, an EndPage routine 244, called by the Executor 26 removes the objects that were created in order to perform a print task with which the printer object 20 is associated. The internal states of the print objects are reset in order to place the objects in a state for starting from scratch with new information.

The print engine 2, creates the virtual page objects 22 according to the object plan specified by a "VIRTPAGE" class. Turning to FIG. 9, the "VIRTPAGE" class structure embodied within each one of the virtual page objects 22 is illustratively depicted. Each one of the virtual page objects 22 includes a set of routines for rendering a single virtual page to an output device based upon a page description provided by a designated print layout (such as the print layout 50). Each virtual page object created by the printer object 20 includes a data section 250 for holding a pointer to the printer object 20, a pointer to LEGOs corresponding to the text and graphics listed on a virtual page of a page format, and a pointer to strings supplied by a user input file that are output when the LEGOs are rendered to an output device. LEGOs are described in greater detail below in conjunction with a description of an Object Dump stage in the preferred printing procedure. When complete, the data section 250 holds all the information needed to render a single virtual page to a printer object, such as the printer object 20. An Install routine 252 initializes the data structures containing the above described virtual page information in the data section 250.

The "VIRTPAGE" class structure also includes a set of routines for creating and storing LEGOs, within the data section 250 of a virtual page object constructed according to the VIRTPAGE class plan, in accordance with commands submitted by print objects created by object commands on a same virtual page of the print layout 50. A Text Draw routine 254 creates and stores a text LEGO object in the list of LEGOs in the data section 250. A Rectangle Draw routine 256 creates and stores a rectangle LEGO object in the list of LEGOs. A Line Draw routine 258 creates and stores a line LEGO object in the list of LEGOs. A Bitmap Draw routine 260 creates and stores a bitmap LEGO object corresponding to a bitmap object line entry of a print layout. A Draw Object routine 262 creates and stores an externally defined LEGO. The Draw Object routine 262 provides an interface for extending the defined set of LEGOs. The Draw Object 262 routine identifies a particular external LEGO (as opposed to the above referenced built-in LEGOs) specified by a call to the Draw Object routine 262 and to create and store a corresponding LEGO. A MakeLego routine 263 is a generic routine which is called by each of the built-in LEGO drawing routines 254, 256, 258 and 260 to actually make and store a LEGO in the list of LEGOs for a current virtual page based upon operands passed by the calling routine to the MakeLego routine 263.

A Render Page routine 264 renders the virtual page, comprising a linked list of LEGOs, to the printer object 20. A DrawLego routine 265 is called by the Render Page routine for each LEGO within the LEGO list of a current virtual page object when the LEGOs are rendered to the printer object 20.

An EndPage routine 266 removes the list of LEGOs from the data section 250 in preparation for the creation of a new set of legos for a next virtual page using the previously created virtual page object. Recycling a virtual page object in such a manner avoids the need to create a new virtual page object and initialize the values associated with the virtual page object when only the content of a virtual page is modified in order to render a next virtual page.

A Font size routine 268 returns a pointer to a current font textmetric structure containing basic character size information. A Font width routine 269 returns a pointer to a width structure for the current font. A Set Font routine 270 designates a new font to be used to create the next text output. A Set Style 272 designates a new style to be used to create the next text output.

A Set Invert Status routine 274 designates the invert status of a page, either normal or up-side down, based upon parsed values obtained from the Invert field (e.g., Invert status 160) within a page format corresponding to the virtual page number assigned to the virtual page. The invert status for a virtual page is retrieved by a Get Invert Status routine 276.

A Set Virtual Page routine 278 sets the drawing area including the position on a physical page, in logical units, for a virtual page. A Set Physical Page routine 280 sets the drawing area for the entire physical page. The drawing area is determined by removing the margins from a physical page as defined by a designated page format.

Having described the structure of the print system 1 including object classes associated with the print system 1, and the parts of the print layout 50 and page format 120 facilitating the printing of a designated file by the print engine 2, attention is now directed to FIG. 10, a flowchart summarizing the steps performed by the print system 1 and its associated objects in order to print a user specified file with a particular print layout and page format in accordance with the present invention. The steps will be described with reference to the print system schematically depicted in FIG. 1. At step 300, a user specifies how to print or display a set of schedule data within a selected one of the user files 10 by specifying a print layout 50 from the set of print layouts 6 and a page format from the set of page formats 8. In addition, the user specifies a date range to be applied when printing out the selected user file and whether the print engine 2 is to operate in simplex page or duplex page mode.

Next, at step 302, the user selects an output device to which the print system 1 will print. The present embodiment provides a user the option of selecting either a printer or a display screen (print preview). After an output device is selected, at step 302 the print engine 2 creates and initializes a device context linking the application, device driver, and the output device, and defines the operating characteristics for the selected output device such as clipping regions, color, etc. for the output device.

Next, during step 304, the print engine 2 creates a VIEW INFORMATION structure that will contain the basic information for printing the selected document according to the selected print layout and page format. The VIEW INFORMATION is illustratively depicted in FIG. 13 and described below. Control then passes to step 306 wherein the print engine 2 creates the printer object 20 and calls the Device Install routine 238 of the printer object 20 to initialize values in the data section 220 with information stored within a "deviceinfo" structure corresponding to the selected output device. Control then passes to step 308.

At step 308, the parser 12 reads the information contained in the selected page format and the designated print mode (entered by a user during step 300) in order to calculate values defining the positions, on a physical page, of cached pages for a range of cached pages (created according to virtual pages defined in the page format). The parser 12 stores the calculated values within VPAGE structures describing each of the virtual pages that are placed upon a single physical page. Turning briefly to FIG. 11, the "vpage" structure created by the parser 12 based upon a single virtual page defined in a page format file and a designated print mode is illustratively depicted. Each vpage structure includes an offset position of the virtual page on the physical page (xleft 310 and ytop 312), a side of the physical page upon which the described page is placed (page side 314), a cached page order number, in a range of cached pages, with which the described page is associated (page order 316), and whether the described page is inverted (invert 318).

Also during step 308, the print engine 2 creates a "vpageinfo" data structure describing the virtual pages that are to be printed upon a selected physical page type. Turning briefly to FIG. 12, the "vpageinfo" structure is illustratively depicted. A landscape flag 320 identifies whether the page represented in the vpageinfo structure is described in a landscape or portrait orientation. If landscape mode specified by the landscape flag 320, then the dimension information in the vpageinfo structure corresponds to the landscape orientation of the page. Furthermore, the orientation specified by a user is complemented when landscape mode is specified by the landscape flag 320. Therefore, if the user selected portrait mode, then the printer will be instructed to print in landscape mode. If landscape mode is selected, then the printer will be instructed to print in portrait mode.

Pointers to virtual pages 322 reference the vpage structures created the parser 12 during step 308 and described above. A number of virtual pages 324 variable identifies the number of virtual pages on the physical page represented by the vpageinfo structure. An X dimension of physical page 326 variable and Y dimension of physical page 328 variable, obtained from the "width" and "height" in the Format line 124 of the page format 120, specify the size of the physical page in logical units. An X dimension of virtual page 330 variable and Y dimension of virtual page 332 variable, obtained from the Page Size line 132 of the page format 120, specify the size of the virtual page in logical units.

A page range 334 variable specifies the maximum range of print layout pages that must be cached in order to output a physical page to a printer. This is especially important when pages are not output in serial order on page sides. For example if a side of a duplex page (to be folded into a four-page booklet) has virtual page one (1) and virtual page (4), then the virtual page range 334 variable, specifying that four (4) virtual pages must be cached in order to print the side, ensures that an adequate range of virtual pages are cached before the cached pages are output on a selected output device.

The vpageinfo structures as well as the other format information in the format header 124 are incorporated into a VIEW INFORMATION data structure 342 illustratively depicted in FIG. 13 and described below. The parser 12 also invokes the printer object 20 during step 308 to create a set of virtual page objects of the type represented in FIG. 9 by calling the Create Virtual Pages routine 240 on the printer object 20. The number of virtual page objects corresponds to the number of virtual pages defined within the designated page format.

Continuing with FIG. 10, after the parser 12 parses the page format 120, control passes from step 308 to step 340 wherein the parser 12 converts object line entries within the print layout 50 into pageinfo data structures comprising: a list of print objects (see FIG. 5) created by the parser 12 from the objects listed in the print layout 50, a print object count identifying the number of print objects in the list, and a flag for identifying an overflow virtual page arising from an OVERFLOW command (e.g. OVERFLOW command 88). Each one of the pageinfo structures corresponds to a page described in the print layout 50. The steps for parsing the print layout 50 are summarized in FIG. 14 and are described below. After a pageinfo structure is created for a page in the print layout 50, the pageinfo structure is placed into a set of pageinfo structures that are referenced by pointers in the VIEW INFORMATION data structure 342 illustratively depicted in FIG. 13.

Turning to FIG. 13, the VIEW INFORMATION data structure 342 includes a view name 344 that corresponds to the name of the text string supplied by the view name 54 of the selected print layout 50. A preferred format 346 contains the name of the file corresponding to the preferred format supplied by the preferred page format 56 and also includes a path to the file containing the preferred format. A view type 348 is loaded with the view information specified in the view type field 58.

A default orientation 350 specifies the default orientation for a page. The default orientation is presented by the User Dialog 4 to a user for printing output. However, the user may override the default by specifying another orientation by means of the User Dialog 4. A preview flag 352 identifies whether the user has selected the "preview" option rather than the print option in order to direct the output to a display screen rather than a printing device. The parser 12 loads the horizontal and vertical meta-page dimensions 60 into meta-page dimensions 354. A drawing area rectangle 356 calculated from the FORMAT 124 and MARGIN 126 information of the page format 120 selected by the user. The total area of the physical page is defined in the physical page rectangle 358.

A current date field 360 holds the current date for purposes of the retrieving schedule information and assigning relative dates within the virtual pages for a current layout page. A last date of printing range 362 identifies the last date in a range of dates assigned to a layout page that is the source of data currently being dumped into a current virtual page. A last date of print job 364 identifies the last date of the printing job in view of a print range specified by a user during step 300.

A pointer to first page information structure 366 references a first pageinfo data structure generated from the print layout 50. A pointer to current page information structure 368 references a currently referenced pageinfo structure. A pageinfo count 370 identifies the total number of pageinfo structures created by the parser 12 from the pages defined in the print layout 50.

Because the print system provides multiple page formats from which a user may select a format, a pointer to current page format 372 is provided for referencing the current selected page format. The VIEW INFORMATION 342 also includes a pointer to vpageinfo 374 corresponding to the currently selected page format. Print setup information 376 references a structure holding information selected by a user via the User Dialog 4 for printing out a schedule such as margins, shading, orientation, duplex/simplex. Print dialog information 378 contains information for initializing values in the User Dialog 4.

Finally, the parser 12 compares the meta-page dimensions in the meta-page dimensions 60 to the logical page dimensions for a virtual page in the page size line 132 and stores conversion values in an X dimension conversion 380 and a Y dimension conversion 382.

Returning to FIG. 10, after parsing the print layout 50 and completing the VIEW INFORMATION structure during step 340, control passes to step 390. If print preview is selected, then control passes to step 392 wherein a preview dialog is displayed to enable a user to preview the schedule information a page at a time. The selected device is thus the display screen rather than a printer. However, the printer object 20 still drives the print preview images for the display screen.

If however, the print to printer selection has been designated, then control passes to step 394 wherein the Executor 26 is invoked and, in cooperation with other control instructions provided by the print engine 2, completes the printing of the schedule document in accordance with the parsed page information contained in the VIEW INFORMATION structure 342. The steps performed by the Executor 26 and print engine 2 to execute a print job in accordance with the VIEW INFORMATION corresponding to the information designated during step 300 are described below in conjunction with FIG. 15. After the user decides to leave the preview mode or the Executor 26 completes printing to a printer, control passes to the END.

Figure 14:
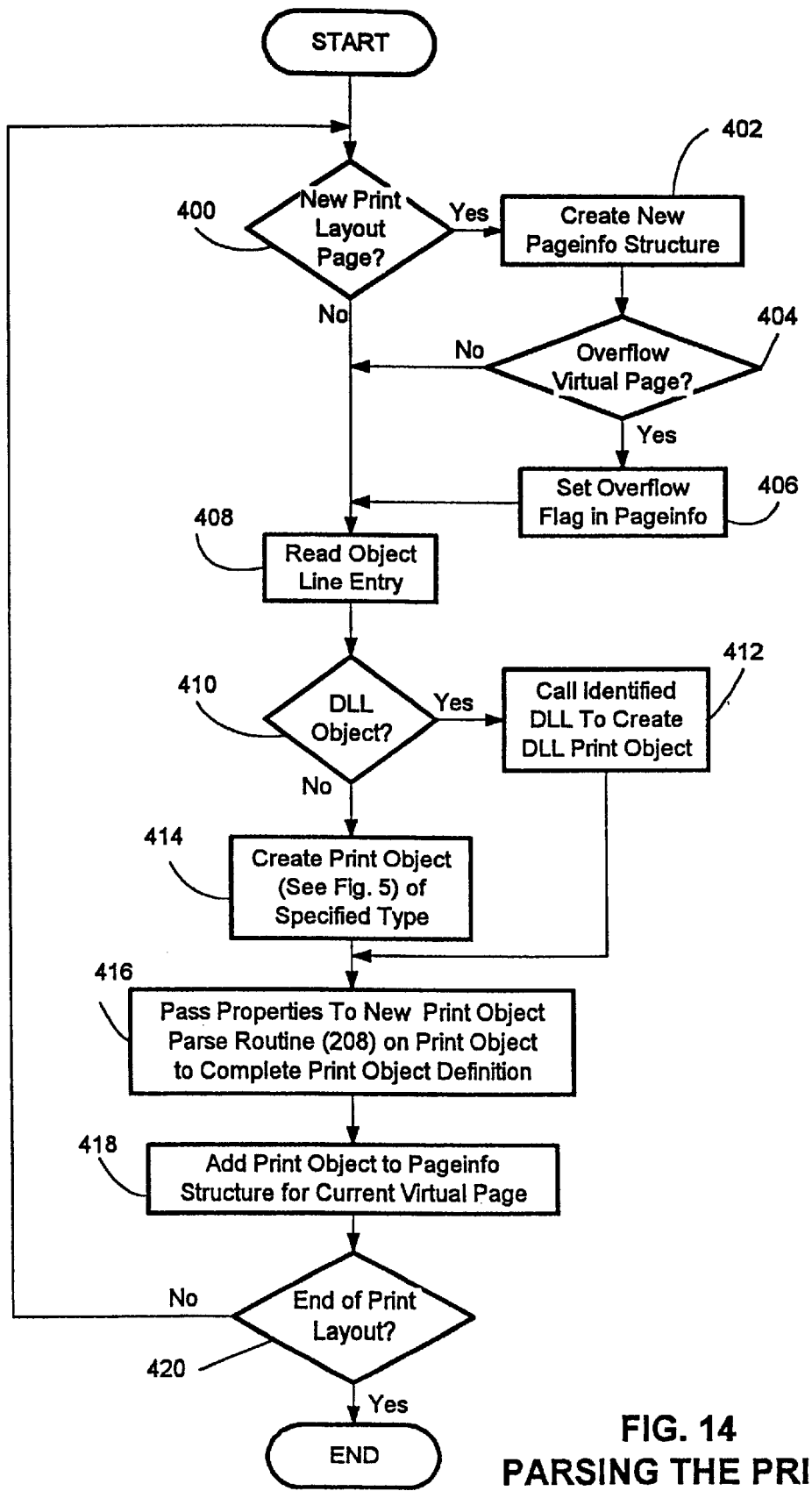
FIG. 14 summarizes the steps performed by a parser within the print engine to transform a print layout into a set of print objects in accordance with the preferred embodiment of the present invention.

Turning to FIG. 14, the steps are summarized for parsing a print layout to render a list of pageinfo structures describing sets of print objects associated with print layout page definitions. As previously mentioned, each pageinfo structure corresponds to a single print layout page. During step 400 the parser 12 determines whether a new print layout page is beginning. If a new print layout page is identified, then control passes to step 402 wherein the parser 12 creates a new pageinfo structure, and adds the new pageinfo structure to a list of pageinfo structures for the print layout 50. Control then passes from step 402 to step 404 wherein the parser 12 previews the next line entry in the print layout 50 to determine whether the line contains the "OVERFLOW" command (e.g., OVERFLOW command 88). If the OVERFLOW command is present, then control passes to step 406 wherein the parser 12 sets the overflow flag in the pageinfo structure for this page. Control then passes to step 408. However, if the new page is not designated as an "OVERFLOW" page, then control passes from step 404 to step 408. If a new print layout page has not been indicated, then control passes directly from step 400 to step 408.

At step 408, the parser 12 reads the object line entry (e.g., line entry 64) and converts the meta-page coordinates of the rectangle specified by the object line entry into coordinates within a virtual page on a physical page by applying the X and Y conversion values 380 and 382 to the meta-page rectangle coordinates. Thereafter, control passes to step 410 wherein the parser 12 determines whether the object line entry specifies a DLL file name 66 after the text string "OBJECT" in an object line entry.

If a DLL file name is specified, then control passes to step 412 wherein the parser 12 calls an entry point (parse routine) for the identified DLL to create a print object corresponding to the DLL object line entry. A DLL object corresponding to the object type is then created and a pointer to the print object and a table of pointers to subroutines associated with the print object is returned to the parser 12. In the preferred embodiment of the present invention, the DLL object functions are similar to the functions provided by the built-in print objects. The routines include functions for setting the area of the print object, drawing the print object, resetting the print object for a next page, and destroying the print object. However, the functions are accomplished by independent program code and data. Furthermore, while the DLL objects are not provided access to the printer object or virtual page objects in order to draw an associated image, the finished image is stored as a LEGO. In an alternative embodiment of the present invention, the external objects have access to the printer object and virtual page objects. After the extended print object is created and the pointer returned, control then passes to step 416 described below.

If at step 410, the parser determines that the print object is a built-in print object, then control passes to step 414 wherein the parser 12 creates a print object of the specified type in accordance with the print object class structure defined in FIG. 5.

At step 416 the parse routine 208 for a particular identified print object incorporates properties associated with the print object into the print object data structure created during step 414. At the completion of step 416, the created print object is complete and control passes to step 418 wherein the parser 12 adds the print object to the list of print objects in the pageinfo structure for the current print layout page and increments the print object counter in the pageinfo structure.

Next, at step 420, if the print layout 50 has been completely parsed, then control passes to the end of the print object parse routine summarized in FIG. 14. Otherwise, control passes to step 400 and the next line of the print layout 50 is previewed to determine whether a new virtual page has been encountered in the print layout 50.

Figure 15:
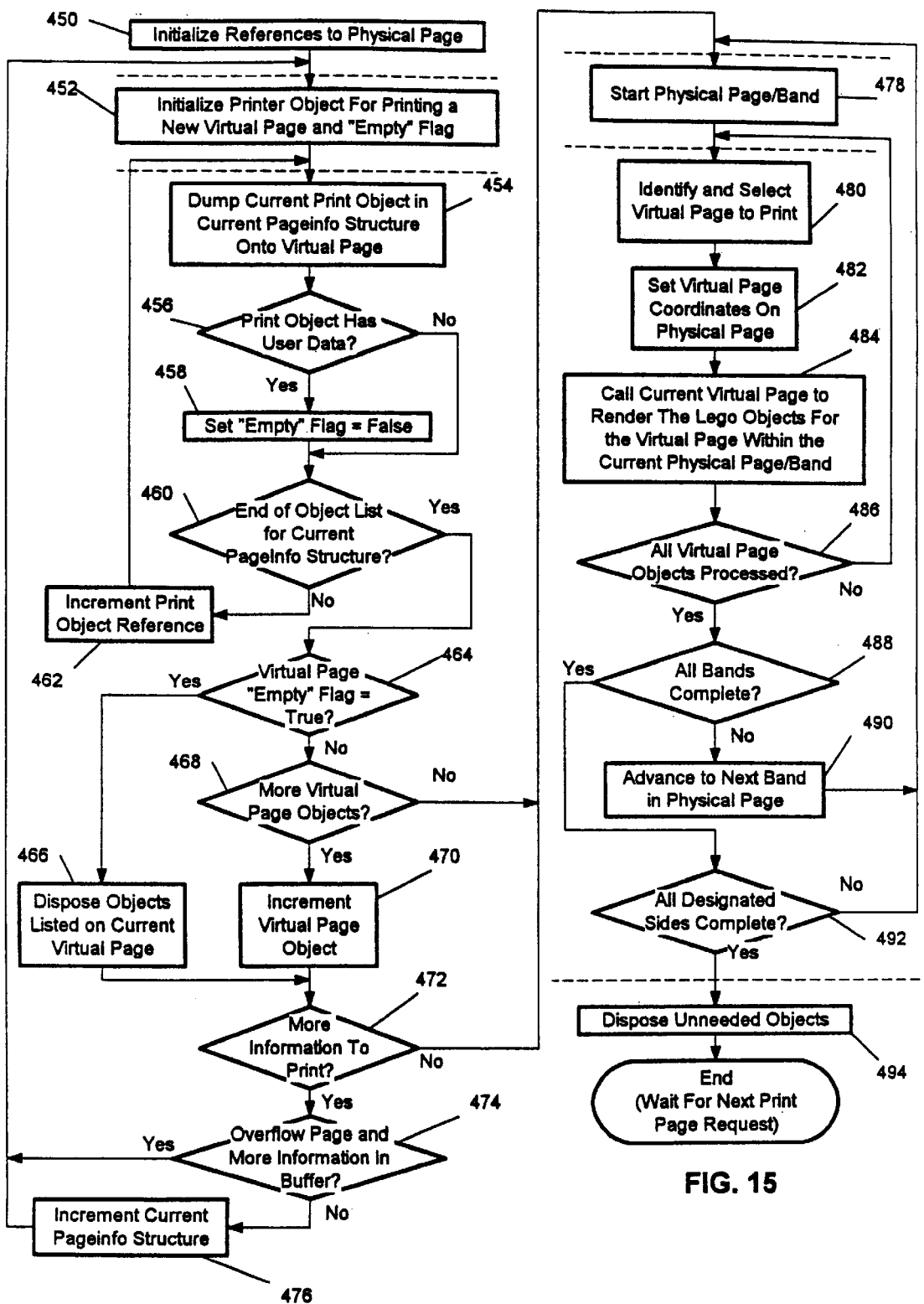
FIG. 15 summarizes the steps performed by an Executor and additional printing engine control operations to convert parsed information arranged in a view information structure into print image data for a selected output device.

Turning to FIG. 15, the steps are summarized for printing out a set of pages of a schedule document in accordance with a date range and parsed information stored within the VIEW INFORMATION structure 342. The steps are executed by the Executor 26 which is arranged to automatically break at pre-set points in the steps illustrated in FIG. 15. The print engine 2 restarts the Executor 26 after a break and in some circumstances after the print engine 2 has updated data structures in the VIEW INFORMATION structure 342. The print process continues from the previous point of interruption in accordance with the present value of a "NextState" variable. During step 450, the Executor 26 starts the print output process by executing a set of initialization procedures. In particular, a "current vpage" variable identifying the vpage structure of current interest in the vpageinfo structure is set to zero (0), a value corresponding to the first vpage in the vpageinfo structure on a physical page. Also, the page side is set to "front" and the NextState variable is set to "Start Page." The first scheduled break is encountered by the Executor 26.

Next, at step 452 corresponding to the "Start Page" state, the Executor 26 initializes the printer object 20 in order to start a new virtual page that was designated either in the initialization stage or during a later stage after completing a previous virtual page. During step 452, the Executor 26 sets the current virtual page referenced by the printer object 20 to the virtual page referenced by the "current vpage" variable value by means of the Set Current Virtual Page routine 232. The Executor 26 also calls the Set Invert Status routine 274 in a virtual page object corresponding to the current vpage in order to assign an inverted (or non-inverted) status to the virtual page object based upon a value in the invert 318 field for the current vpage.

The Executor 26 sets an "Empty" flag during step 452. Typically, the empty flag is set to "true" in order to cause the Executor 26 to dispose of any virtual pages for which user data (e.g., schedule information) is not provided by a currently selected user file. An example would be a daily view calendar day in which a user did not have schedule information. If a user designates printing of all virtual pages, then the Empty flag is set to False during step 452. Thereafter, the Executor 26 sets the NextState variable to "Dump Objects." The second scheduled break occurs.

The Dump Objects state begins at step 454. During the Dump Objects state, LEGOs corresponding to print objects listed within a current pageinfo structure are created and stored within a current virtual page object. This information is supplemented by data from the user file designated prior to the commencement of the print page generation process. The data from the user file is accessed in accordance with a current reference date for retrieving schedule data for a particular calendar date. The retrieved user file data is also stored in the current virtual page object.

LEGOs represent a relatively low, and extremely useful, level in the hierarchy of a print layout definition. The LEGOs are used by the print engine 2 to generate the actual print data provided to the output device during a "Render" stage (described below). The current list of LEGO types comprises: text, rectangle, line, bitmap, buffered text, and external object. The first five LEGO types are built into the print system 1. The buffered text LEGO is associated with a buffer for a virtual page intended to hold text for which the print object only has a temporary copy. The external object LEGO type corresponds to print objects defined within DLL files.

During step 454, the Executor 26 calls the Increment Image routine 210 for a currently referenced print object on a current pageinfo structure. The Increment Image routine 210 in turn calls the currently referenced virtual page object to render a set of LEGOs corresponding to the print object. In particular, when the Executor calls the Increment Image routine 210 for a print object during step 454, the Increment Image routine 210 executes a script of draw routine calls specifying ones of the draw routines 254, 256, 258, 260, and 262 provided by a virtual page object.

Each call by the Increment Image routine 210 to the draw routine 254, 256, 258, 260 or 262 is accompanied by a set of operands enabling the draw routine to generate a LEGO for placement of a particular graphic or text image at a particular location (in physical page units) on a virtual page. The physical location of a LEGO on a physical page is computed during a "Render" stage described below. The virtual page object with which the print object is associated stores the generated LEGO within a list of LEGOs maintained in the data section 250 of the virtual page object. After completing the Increment Image routine 210 for the current print object, control passes to step 456.

At step 456, if the print object dumped during step 454 is associated with user data, then control passes to step 458 wherein the current virtual page is not "empty" and therefore the Empty flag is set to "False". Control then passes to step 460. If user data was not found corresponding to the dumped print object during step 454, then control passes from step 456 to step 460.

At step 460, if additional objects exist on the currently accessed pageinfo structure, then control passes to step 462 wherein the next print object is accessed in the list of print objects within the current pageinfo structure. However, if no further print objects are listed for the current pageinfo structure, then control passes to step 464.

At step 464, if the Empty flag is set to true, indicating that the user does not wish to print virtual pages that do not have schedule data and in fact no schedule data was retrieved for the current date when print objects were dumped upon the virtual page, then control passes to step 466. At step 466, the Executor in effect recycles the current virtual page by removing the print object information from the "empty" virtual page. This current virtual page will be re-used to print the next print layout page information and schedule data. Control then passes to step 472 (described below).

If however at step 464, a page is not empty or the user has requested that even empty pages be considered not empty, then control passes to step 468. At step 468, if all of the virtual pages for a physical page have been used, then the physical page is full and the state variable value is changed from the Dump Objects state designation to the "Start Band" state. The next step that will be performed by the Executor 26 will be step 478 (described below). Otherwise, if additional virtual page objects are available, then control passes to step 470 and the Executor 26 increments the value of the current vpage variable to reference the next available virtual page object. Control then passes to step 472.

At step 472, if more information is available for printing, either additional pageinfo structures or overflow data from a designated overflow page, then the Next State variable is set to "Start Page" and control passes to step 474. It is noted that in the preferred embodiment of the invention, the Dump Objects state ends at step 472 and therefore steps 474 and 476 are actually performed by separate executable code in the print engine 2. At step 474, if the current pageinfo is associated with an overflow page and the overflow buffers contain data, then control passes to step 452. Otherwise, the print engine 2 is finished with the current pageinfo structure for the current date and the print engine advances to the next pageinfo structure (and next print date in range if necessary) during step 476. Control then passes to step 452. If however at step 472 no more information is available, then the Next State variable is set to "Start Band" and step 478 will next be performed by the Executor 26.

At step 478, the Executor 26 sets up variables to reference a current page and band in accordance with a well known WINDOWS application program interface for starting a print band. The Next State variable is set to "Render" and the next steps performed by the Executor 26 will render graphical and text data for the virtual pages on the currently referenced band. In particular, at step 480 the Executor 26 identifies a virtual page on the physical page falling within the present band and sets this page number in the printer object 20.

Next at step 482, the Executor 26 sets the coordinates on the physical page for the virtual page selected during step 480 within the printer object 20 and control passes to step 484 wherein the printer object 20 calls the Render Page routine 264 in the current virtual page object to render graphical and text information corresponding to the LEGOs falling within the current band. In turn, the Render Page routine 264 calls the DrawLego routine 265 for each LEGO listed for a current virtual page object in order to render the LEGO to the physical page.

During the DrawLego routine 265, after saving the original LEGO rectangle coordinates (defining the position of the LEGO on the virtual page), the LEGO rectangle coordinates are mapped to the physical coordinates of the page by reference to the coordinates assigned to the current virtual page on the physical page. If the page is upright, then offsets corresponding to the location of the virtual page in the physical page are applied to the LEGO coordinates within the virtual page.

If the virtual page is inverted, then the point "0,0" the top left corner of the virtual page is transferred to the bottom right corner of the virtual page on the physical page, and the LEGO coordinates are reassigned based upon their location within the virtual page. The values stored in the left/right and top/bottom variable sets are exchanged so that the value for the right side is greater than the value for the left side and the bottom value is greater than the top value.

Next, a LEGO-specific render routine is called based upon the type of LEGO identified in the call to the DrawLego routine 265. The LEGO specific routine renders all of the print data needed by the selected output device for the displaying the LEGO and any associated user data. Thereafter, the LEGO rectangle is restored so that the relative position of the LEGO rectangle within a virtual page can be used for a next virtual page that may be located in a different position on a physical page. Control next returns to the calling Render Page routine 264 to select a next LEGO from the list of LEGOs for the current virtual page object.

After all of the LEGOs are rendered for a current virtual page, control passes to step 486 wherein the Executor 26 determines whether all virtual pages have been processed. Because virtual pages are not necessarily in order on the pages, the Executor 26 checks all of the virtual pages. If additional virtual pages remain to be processed for the current selected band, then control passes to step 480. Otherwise control passes to step 488 wherein the Executor 26 determines whether additional bands remain for the current physical page side.

At step 488, if additional bands remain, then control passes to step 490 and the Executor 26 advances to the next print band on the physical page, the Next State variable is set to "Start Band" and control returns to step 478. If the physical page does not have any more bands, then control passes to step 492. At step 492 if the back side of a physical page still needs to be printed, then the Next State variable is set to "Start Band" and control passes to step 478 to start the first band of the back side of the current physical page. Otherwise, the Next State variable is set to "Cleanup" and control passes to step 494.

During the step 494, the Executor 26 performs straightforward operations to dispose of all of the LEGOs created in order to render and print out the physical page. It is noted that the print objects created during the parsing step 340 are not disposed after printing out a single physical page. Instead, the print objects are re-used in order to generate subsequent virtual pages for later applied dates in a date range supplied by the user when defining a print job. Re-using the print objects provides enhanced performance since the time consuming parsing steps are avoided.

Figure 16:
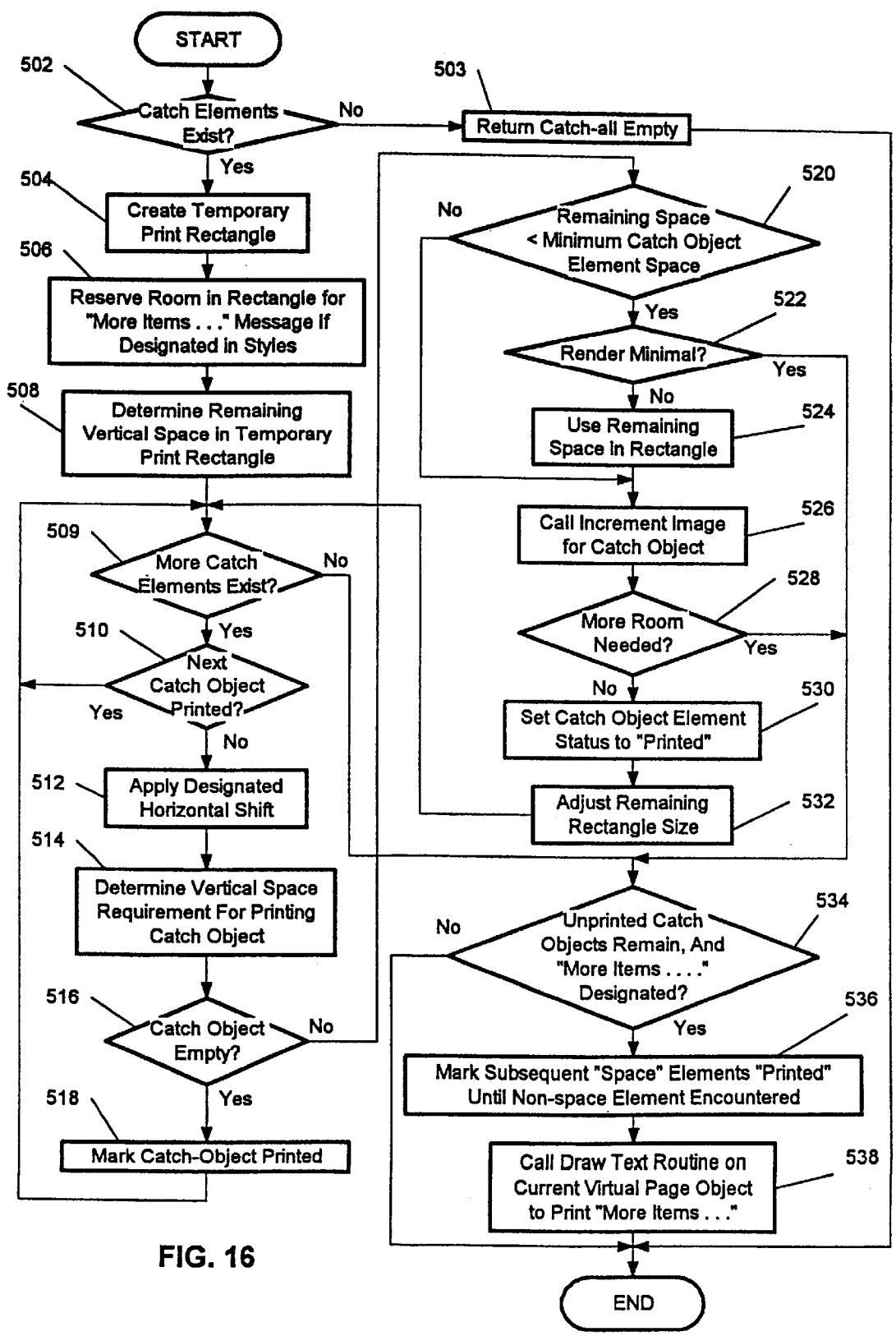
FIG. 16 summarizes the steps performed by the print system in accordance with a catch-all buffer rendering routine.

Catch-all objects, described above in conjunction with FIGS. 6 and 7 provide buffers for receiving print data from print objects. The information within the catch-all objects is displayed within rectangles specified by Overflow objects that call the catch-all objects in order to render the buffered information associated with the catch-all objects. Turning now to FIG. 16, the steps are summarized for a catch-all object's Render routine 614 to output the catch-all object's contents, to the extent space exists, to a specified Overflow object rectangle.

At step 502, if no catch object elements exist in the catch object, then control passes to step 503 wherein a "catch-all empty" message is issued by the Render routine 614 and control passes to the End. Otherwise, control passes to step 504 where a temporary print rectangle is created to keep track of the space available for printing catch objects associated with the catch-all object.

If designated in the styles parameter, a "More Items . . . " message is inserted in the bottom line of an overflow rectangle when all of the contents of a catchall object cannot be printed within the area limits of the temporary print rectangle. In such an instance, a bottom line of the print rectangle is reserved for the "More Items . . . " message during step 506. Next, in preparation for filling the print rectangle, at step 508 an available vertical height variable is set equal to the remaining vertical space in the print rectangle.

At step 509, if catch object elements remain within the catch object element list, then control passes to step 510. Otherwise, control passes to step 534 (described below). At step 510, a next catch object element is accessed in the list of catch object elements in order to determine whether the catch object element has been printed. If the next catch object element has been printed, then control returns again to step 509. If the next catch object element is not printed, then control passes to step 512.

At step 512, a horizontal shift (passed to the Render routine 614) is applied. At step 514 the minimum vertical space needed to print the current catch object is determined. The amount of vertical space needed will be affected by whether a minimal rendering or a full rendering has been requested when the Render routine 614 was called.

At step 516 if the catch object is empty, then control passes to step 518 wherein the catch object element is marked as "printed" and control returns to step 510. Otherwise, if the catch object is not empty, then control passes to step 520.

At step 520, if the remaining vertical space in the temporary print rectangle meets the space requirements for a current catch object, then control passes to step 526 described below. Otherwise, control passes from step 520 to step 522. At step 522, if the render "minimal" option has been designated for the catch-all object rendering routine, then control passes to step 534 (described below). Otherwise, control passes to step 524 wherein the vertical space allocated to print the catch object is set to the remaining space in the temporary print rectangle.

At step 526 the Increment Image routine 644 for the catch object is called to place the catch object data in the allocated rectangle space. Control then passes to step 528 wherein if the Increment Image routine 644 does not return a message indicating that more room is needed (i.e., the catch-all object met the space restrictions of the remaining portion of the temporary print rectangle) then control passes to step 530.

At step 530, the status of the catch object element corresponding to the current catch object is set to "printed". Next, at step 532 the remaining vertical space in the temporary print rectangle is adjusted by the vertical space consumed by the current catch object. Control then passes to step 509.

If at step 528, the Increment Image routine 644 returns a message indicating that more room is needed to print the catch object, then control passes to step 534. At step 534, if additional unprinted catch-objects remain and the styles designated for the Render routine 614 designate the "More Items . . . " style, then control passes to step 536. At step 536, any subsequent catch objects, immediately following the last processed catch object, that are merely "vertical space" objects are marked as "printed" (until a non-space catch object is encountered). Next, at step 538 a Draw Text routine on the current virtual page is called in order to print the "More Items . . . " message at the bottom of the rectangle specified by the overflow object corresponding to the catch-all object. Control then passes to the End. If, at step 534 the "More Items . . . " style is not specified, or no unprinted catch object elements remain, then control passes to the End.

The embodiment of the present invention illustrated in the drawings and discussed above was chosen and described to provide the best illustration of the principles of the invention and its practical application to thereby enable one of ordinary skill in the art to utilize the invention in accordance with the inventors' preferred embodiment as well as various other embodiments and with various modifications as are suited to particular other contemplated uses of the invention. For example, while the present invention is described in the context of the preferred MICROSOFT Schedule+ application program, the present invention has wide ranging application to a number of different applications where data is combined with forms that are in turn printed out on a variety of different physical formats. Such modifications and variations are within the intended scope of the invention as determined by the appended claims when interpreted in accordance with the breadth to which they are fairly, legally, and equitably entitled. There is no intent to limit the invention to the disclosed embodiment. On the contrary, the intent is to cover all alternatives, modifications and equivalents included within the spirit and scope of the invention as defined by the appended claims.

What is claimed is:

1. A system for outputting display information according to a print layout comprising a first set of entries describing a set of display items on a virtual page and relative position assignments for the display items on the virtual page, and a page format comprising a description of a physical page and including a second set of entries describing one or more pages on the physical page, the system comprising:

means for selecting the print layout from a set of print layouts;

means for selecting the page format from a set of page formats;

a view processor for creating the display information by automatically placing print information, corresponding to the first set of entries of the selected print layout, within the one or more pages described by the second set of entries of the selected page format wherein each display item is given a location on the one or more pages as a function of its relative position assignment on the virtual page; and a print output generator for instructing an output device to render the display information as a function of the physical page description of the selected page format.

2. The system of claim 1 further comprising a page format generator for creating a set of page objects corresponding to the second set of entries, the set of page objects being constructed in accordance with a page object class structure.

3. The system of claim 1 further comprising a print layout generator for creating a set of print objects corresponding to the first set of entries, the set of print objects being constructed in accordance with at least one print object class structure provided by the system.

4. The system of claim 3 wherein the at least one print object class structure comprises a set of print object class structures, and wherein a print object class structure, within the set of print object class structures, is associated with a type of display item.

5. The system of claim 4 further comprising a set of routines for generating basic display elements according to dimension and location information, and wherein the set of print object class structures comprise routines for calling specified ones of the set of routines in order to create a composite image including the basic display elements.

6. The system of claim 4 wherein the first set of entries comprise a list of print object line entries identifying print object types represented within the set of print object classes.

7. The system of claim 6 wherein the print layout includes property line entries associated with, and further defining, a corresponding entry in the first set of entries.

8. The system of claim 7 wherein a print object class structure, of the set of print object class structures, includes a property parsing routine associated with a particular print object class.

9. The system of claim 4 wherein the at least one print object class structure includes an overflow object class structure for printing the contents of a buffer for receiving data from print objects.

10. The system of claim 9 wherein the overflow object class structure includes means for designating a specific named buffer from which data is retrieved for display.

11. The system of claim 9 wherein the overflow object class structure includes means for designating disposal of non-printed information remaining in the buffer after an area allocated to an overflow object specifying the buffer is filled.

12. The system of claim 11 wherein the means for designating disposal includes at least the options of disposing the non-printed information after (1) the overflow object is filled, and (2) a page, of the set of pages, containing the overflow object is completed.

13. The system of claim 9 wherein the overflow object class structure includes means for designating a portion of the full set of information for each item in the buffer to be printed in an area allocated to an overflow object.

14. The system of claim 3 wherein the at least one print object class structure includes routines for generating print form elements for displaying schedule information provided by a user file.

15. The system of claim 14 wherein the at least one print object class structure includes a calendar object class structure for displaying a calendar and associated text provided by a user file.

16. The system of claim 14 wherein the at least one print object class structure includes an appointment object class structure for displaying a list of appointments provided by a user file.

17. The system of claim 3 wherein the at least one print object class structure includes a tasklist object class structure for displaying a list of tasks provided by a user file.

18. The system of claim 3 wherein the at least one print object class structure includes a contact information object class structure for displaying a list of contacts and associated contact information provided by a user file.

19. The system of claim 14 wherein the at least one print object class structure includes an event object class structure for displaying an event provided by a user file on a particular day without assigning a particular time within the day to the event.

20. The system of claim 3 further comprising means for calling a routine within an external file for creating a print object specified by an entry, in the first set of entries; and wherein the external file further contains means for generating print information corresponding to the entry.

21. The system of claim 20 wherein the external file includes multiple print object definitions for creating print objects of multiple types.

22. The system of claim 3 wherein the print layout comprises a text file.

23. The system of claim 1 wherein the view processor is configurable, in accordance with a user selection, to provide output to one of multiple output device types for which the system must provide different information for a same view.

24. The system of claim 23 further comprising a set of print object classes that are defined independently with respect to output device type.

25. The system of claim 23 further comprising a printer object class that is defined independently with respect to output device type, and wherein the system is configurable to enable the system to render print output data according to a user designated output device type.

26. The system of claim 1 wherein each one of the set of pages includes a description of the location of the page upon the physical page and a page order defining a filling order for the page with respect to other pages in the set of pages.

27. The system of claim 26 wherein each one of the set of pages further comprises an invert field describing whether the page is inverted.

28. The system of claim 26 wherein the page order is separately defined for a simplex page mode and a duplex page mode.

29. The system of claim 1 wherein the display items comprise form elements for displaying schedule information.

30. A computer-readable medium including machine executable code for instructing a computer system to render a print document to an output device based upon a print layout comprising a first set of entries describing a set of display items on a virtual page and relative position assignments for the display items on the virtual page, and a page format comprising a description of a physical page and including a second set of entries describing one or more pages on the physical page, the computer-readable medium comprising:

computer executable code for selecting the print layout from a set of print layouts;

computer executable code for selecting the page format from a set of page formats;

computer executable code for creating the print document by automatically placing print information, corresponding to the first set of entries of the selected print layout, within the one or more pages described by the second set of entries of the selected page format wherein each display item is given a location on the one or more pages as a function of its relative position assignment on the virtual page; and computer executable code for instructing an output device to render the print document as a function of the physical page description of the selected page format.

* * * * *

UNITED STATES PATENT AND TRADEMARK OFFICE
CERTIFICATE OF CORRECTION

PATENT NO.    : 6,101,513                                  Page 1 of 1
DATED         : August 8, 2000
INVENTOR(S)   : Shakib et al.

It is certified that error appears in the above-identified patent and that said Letters Patent is hereby corrected as shown below:

Column 1,
Line 39, "emerge" should read -- merge --.

Column 5,
Line 28, "nexu" should read -- next --.

Column 9,
Line 27, "ASTYLES" should read -- A STYLES --.

Column 10,
Lines 34-36, are incorrectly indented.

Signed and Sealed this

Ninth Day of September, 2003

JAMES E. ROGAN
*Director of the United States Patent and Trademark Office*